United States Patent
Koganehira et al.

(10) Patent No.: US 11,485,867 B2
(45) Date of Patent: Nov. 1, 2022

(54) INK COMPOSITION

(71) Applicant: Seiko Epson Corporation, Tokyo (JP)

(72) Inventors: Shuichi Koganehira, Matsumoto (JP); Yoshitaka Miyajima, Matsumoto (JP); Keigo Ando, Matsumoto (JP)

(73) Assignee: SEIKO EPSON CORPORATION ( * ) Notice: Subject to any disclaimer, the term of this patent is extended or adjusted under 35 U.S.C. 154(b) by 274 days.

(21) Appl. No.: 16/651,402

(22) PCT Filed: Sep. 20, 2018

(86) PCT No.: PCT/JP2018/034899
§ 371 (c)(1),
(2) Date: Mar. 27, 2020

(87) PCT Pub. No.: WO2019/065469
PCT Pub. Date: Apr. 4, 2019

(65) Prior Publication Data
US 2020/0283650 A1   Sep. 10, 2020

(30) Foreign Application Priority Data

Sep. 28, 2017 (JP) .............................. JP2017-188670
Sep. 28, 2017 (JP) .............................. JP2017-188778

(51) Int. Cl.
C09D 11/102 (2014.01)
C09D 11/033 (2014.01)
C09D 11/107 (2014.01)
C08K 13/02 (2006.01)

(52) U.S. Cl.
CPC .......... C09D 11/102 (2013.01); C09D 11/033 (2013.01); C09D 11/107 (2013.01); C08K 13/02 (2013.01)

(58) Field of Classification Search
CPC .................................................. C09D 11/033
See application file for complete search history.

(56) References Cited

U.S. PATENT DOCUMENTS

| 2005/0235870 A1 | 10/2005 | Ishihara |
| 2007/0117882 A1 | 5/2007 | Aoyama et al. |
| 2007/0265376 A1 | 11/2007 | Sao et al. |
| 2018/0187034 A1 | 7/2018 | Takeno et al. |
| 2018/0362791 A1 | 12/2018 | Nio et al. |

FOREIGN PATENT DOCUMENTS

| JP | H03-255176 A | 11/1991 |
| JP | 2005-307184 A | 11/2005 |
| JP | 2007-277355 A | 10/2007 |
| JP | 2007-302805 A | 11/2007 |
| JP | 2011-178981 A | 9/2011 |
| JP | 2013-189598 A | 9/2013 |
| JP | 2014-051605 A | 3/2014 |
| JP | 2017-008319 A | 1/2017 |
| WO | WO-2017-104477 A1 | 6/2017 |

OTHER PUBLICATIONS

Machine translation of JP2007277355 (Year: 2007).*

* cited by examiner

*Primary Examiner* — Wenwen Cai
(74) *Attorney, Agent, or Firm* — Harness, Dickey & Pierce, P.L.C.

(57) ABSTRACT

An ink composition includes water, a resin, a coloring material, an alcohol (A) and a solvent (B). The alcohol (A) has a vapor pressure at 25° C. of 0.050 mmHg or greater and a solubility at 25° C. in 100 g of water of less than 3 g. The solvent (B) includes at least one selected from the group consisting of glycol ethers having a vapor pressure at 25° C. of less than 0.050 mmHg and a solubility at 25° C. in 100 g of water of 3 g or greater and alkanediols having a vapor pressure at 25° C. of less than 0.050 mmHg and a solubility at 25° C. in 100 g of water of 3 g or greater.

4 Claims, No Drawings

INK COMPOSITION

CROSS REFERENCE TO RELATED APPLICATIONS

This application is a U.S. National Stage Application of International Application No. PCT/JP2018/034899, filed on Sep. 20, 2018, and published in Japanese as WO 2019/065469 A1 on Apr. 4, 2019, which claims priority to Japanese Patent Application No. 2017-188778, filed on Sep. 28, 2017 and Japanese Patent Application No. 2017-188670, filed on Sep. 28, 2017. The entire disclosures of the above applications are incorporated herein by reference.

BACKGROUND

Technical Field

The present invention relates to ink compositions.

Related Art

Recording methods for forming an image on a recording medium based on image data signals include ink jet processes and the like. In ink jet processes, running costs are low because, by using an inexpensive apparatus, an image is formed directly on a recording medium by ejecting ink (an ink composition) only onto a necessary image area, and, therefore, the ink composition can be efficiently used. A typical ink used for an ink jet process is an ink composition including, as main components, a coloring material or colorant, water, which is used to dissolve or disperse the coloring material or colorant therein, and a water-soluble organic solvent.

For example, JP-A-2007-302805 discloses an ink composition that includes a specific betaine-based surfactant and a linear saturated aliphatic alcohol having a hydroxyl value and a carbon number each within a predetermined range. A purpose of the disclosure is to provide an ink composition in which formation of bubbles is reduced and good defoaming characteristics are exhibited, and also, which has excellent ejection stability and enables beautiful color development.

Furthermore, JP-A-2011-178981 discloses an ink composition that includes a colorant, water, an alkanediol having low water solubility, a crystalline sugar alcohol that is solid at 20° C., and a water-soluble glycol ether. The literature discloses that the ink composition realizes an image with excellent quality and gloss even when printing with a short landing time difference is performed on a recording medium having a low absorbency with respect to aqueous ink and further that the ink composition has excellent drying characteristics.

However, with regard to the ink composition of JP-A-2007-302805, there is a need to further improve low-foaming characteristics and defoaming characteristics. Furthermore, with regard to the ink composition described in JP-A-2011-178981, there is a need to further improve high-speed recording characteristics and fast drying characteristics.

SUMMARY

The present invention has been made to address the issues described above, and objects of the present invention are to provide an ink composition that has improved low-foaming characteristics and defoaming characteristics and to provide an ink composition in which excellent high-speed recording characteristics and fast drying characteristics are satisfied together in a balanced manner.

The present inventors diligently performed studies to address the issues described above and found the following. For an ink composition including water, a resin, a coloring material, and a solvent, it is possible to use, as the solvent, a combination of a specific low-water-solubility alcohol and a specific water-soluble solvent; this enables the production of an ink composition that has improved low-foaming characteristics and defoaming characteristics and an ink composition in which high-speed recording characteristics and fast drying characteristics are satisfied together in a balanced manner. Accordingly, the present invention was completed.

Specifically, an ink composition of the present invention includes water, a resin, a coloring material, an alcohol (A), and a solvent (B). The alcohol (A) has a vapor pressure at 25° C. of 0.050 mmHg or greater and a solubility at 25° C. in 100 g of water of less than 3 g. The solvent (B) includes at least one selected from the group consisting of a glycol ether having a vapor pressure at 25° C. of less than 0.050 mmHg and a solubility at 25° C. in 100 g of water of 3 g or greater and an alkanediol having a vapor pressure at 25° C. of less than 0.050 mmHg and a solubility at 25° C. in 100 g of water of 3 g or greater. It is preferable that the alcohol (A) include a symmetrical alkane skeleton having 7 or more carbon atoms. It is preferable that the alcohol (A) be at least one selected from the group consisting of 2,4-dimethyl-3-pentanol and 2,6-dimethyl-4-heptanol. It is preferable that the glycol ether be at least one selected from the group consisting of diethylene glycol mono-n-butyl ether, triethylene glycol monoethyl ether, triethylene glycol mono-n-butyl ether, and tripropylene glycol monomethyl ether. It is preferable that the alkanediol be at least one selected from the group consisting of 3-methyl-1,5-pentanediol, 1,2-hexanediol, 1,2-pentanediol, 4-methyl-1,2-pentanediol, and 3,3-dimethyl-1,2-butanediol. It is preferable that the ink composition further include a polysiloxane-based surfactant and that the polysiloxane-based surfactant be a compound represented by formula (1) below.

Chem. 1

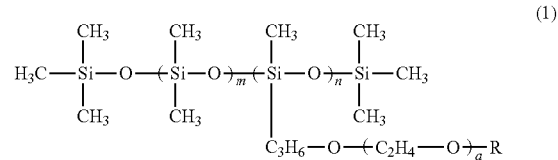

In formula (1), R represents a hydrogen atom or a methyl group, a represents an integer of 2 to 18, m represents an integer of 0 to 70, and n represents an integer of 1 to 8.

In addition, an ink composition of the present invention includes water, a resin, a coloring material, an alcohol (A), and a solvent (C). The alcohol (A) has a vapor pressure at 25° C. of 0.050 mmHg or greater and a solubility at 25° C. in 100 g of water of less than 3 g. The solvent (C) includes at least one selected from the group consisting of an alkoxy alcohol having a vapor pressure at 25° C. of 0.050 mmHg or greater and a solubility at 25° C. in 100 g of water of 3 g or greater and an alkanediol having a vapor pressure at 25° C. of 0.050 mmHg or greater and a solubility at 25° C. in 100 g of water of 3 g or greater.

It is preferable that the alcohol (A) include a symmetrical alkane skeleton having 7 or more carbon atoms. It is preferable that the alcohol (A) be at least one selected from the group consisting of 2,4-dimethyl-3-pentanol and 2,6-dimethyl-4-heptanol. It is preferable that the alkoxy alcohol be at least one selected from the group consisting of 3-methoxy-1-butanol and 3-methoxy-3-methyl-1-butanol and that the alkanediol be 3-methyl-1,3-butanediol. It is preferable that the ink composition further include a polysiloxane-based surfactant and that the polysiloxane-based surfactant be a compound represented by formula (1) below.

Chem. 2

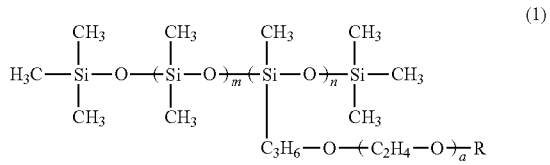

(1)

In formula (1), R represents a hydrogen atom or a methyl group, a represents an integer of 2 to 18, m represents an integer of 0 to 70, and n represents an integer of 1 to 8.

It is preferable that the ink composition further include an alkanediol (D) having a melting point of 80° C. or higher and a solubility at 25° C. in 100 g of water of 3 g or greater. It is preferable that the alkanediol (D) include a symmetrical alkane skeleton. It is more preferable that the alkanediol (D) be 2,5-dimethyl-2,5-hexanediol.

DESCRIPTION OF EMBODIMENTS

In this specification, the term "low-foaming characteristics" refers to properties in which bubbles are not easily formed in an ink composition, and the term "defoaming characteristics" refers to properties in which bubbles formed in an ink composition are easily eliminated.

A first embodiment of the present invention (hereinafter referred to as the "first embodiment") will be described in detail below. However, the present invention is not limited to the embodiment, and various modifications may be made without departing from the gist of the invention.

Ink Composition

An ink composition (also referred to as "ink") of the first embodiment includes water, a resin, a coloring material, an alcohol (A), and a solvent (B). The alcohol (A) has a vapor pressure at 25° C. of 0.05 mmHg or greater and a solubility at 25° C. in 100 g of water of less than 3 g. The solvent (B) includes at least one selected from the group consisting of glycol ethers having a vapor pressure at 25° C. of less than 0.050 mmHg and a solubility at 25° C. in 100 g of water of 3 g or greater and alkanediols having a vapor pressure at 25° C. of less than 0.050 mmHg and a solubility at 25° C. in 100 g of water of 3 g or greater. Note that in this specification, the alcohol (A) may be referred to as a low-water-solubility alcohol (A), and the solvent (B) may be referred to as a water-soluble solvent (B).

Such an ink composition has excellent low-foaming characteristics and defoaming characteristics, and a major reason for this is believed to be as follows; however, the present invention is in no way limited by the major reason. Specifically, first, when the low-water-solubility alcohol (A), which has high volatility, is combined with the water-soluble solvent (B), which has low volatility, a solution can be obtained in which the alcohol (A), which has low water solubility, is solubilized or emulsified with the water-soluble solvent (B). It is believed that as a result of a surface activity effect of the water-soluble solvent (B), the low-water-solubility alcohol (A) is solubilized, forming micelles of less than 1 or is emulsified, forming micelles of approximately 1 Further, in the solution, the low-water-solubility alcohol (A) tends to be oriented along the gas-liquid interface, and mainly because of this, films (surface areas) of bubbles do not easily expand. As a result, low-foaming characteristics are improved. On the other hand, even when bubbles are formed, the low-water-solubility alcohol (A), which has high volatility, can easily escape from the films, and mainly because of this, films become thinner, and thus the films cannot be maintained. As a result, defoaming characteristics are improved. With regard to the defoaming characteristics, a major reason that defoaming (bubble breakage) can be significantly improved is believed to be that the stability of the gas-liquid interface can be significantly changed by evaporating the low-water-solubility alcohol (A) from the films, rather than evaporating the water-soluble solvent (B).

Furthermore, in ink jet printers equipped with a large-capacity ink tank (hereinafter also simply referred to as a "tank"), an ink inlet port formed on the tank side is usually small in many cases so as to ensure that when ink is injected into the tank, splashed ink is prevented from spattering to the outside of the tank. In this case, if ink is injected into the tank forcefully, bubbles are intensely formed in the ink within the tank, and thus the bubbles sometimes fill the space up to the inlet port disposed in an upper portion. In this case, if additional ink is injected into the tank, some ink spills out from the inlet port; it is therefore necessary to wait until the bubbles disappear, and if the bubbles do not completely disappear, additional time may be necessary. On the other hand, the ink composition of the first embodiment has improved low-foaming characteristics and defoaming characteristics, and, therefore, the ink composition can be efficiently loaded into a tank having a small inlet port formed therein. Accordingly, the ink composition can be suitably used as an ink that is to be used for an ink jet printer equipped with a large-capacity tank.

It may be conceivable to add, as an antifoaming agent, an additive such as a surfactant to the ink composition; however, this is not preferable because such additives typically have a molecular weight comparable to the molecular weight of a resin used to disperse the coloring material included in an ink jet ink and, therefore, degrade dispersion stability and ejection stability. On the other hand, the ink composition of the first embodiment may not include an additive having a high molecular weight comparable to the molecular weight of such a resin; nevertheless, the combination of the alcohol (A) and the solvent (B), which have relatively low molecular weights, improves low-foaming characteristics and defoaming characteristics while preventing decreases in dispersion stability and ejection stability.

Furthermore, in many cases, ink jet ink compositions used in an ink jet process typically include a penetrating agent, such as an alkanediol or a glycol ether, and/or an acetylene glycol-based or polysiloxane-based surfactant so as to reduce surface tension to suppress intercolor bleeding and the like. Ink jet compositions including such a penetrating agent and/or surfactant tend to have high-foaming characteristics and decreased defoaming characteristics mainly because of the decrease in surface tension. On the other hand, the ink composition of the first embodiment exhibits excellent low-foaming characteristics and defoaming characteristics even when surface tension is reduced, owing to the combination of the alcohol (A) and the solvent (B). Accordingly, with the ink composition of the first embodiment, for example, intercolor bleeding and the like due to a reduction in surface tension can be suppressed, and excellent low-foaming characteristics and defoaming characteristics are satisfied.

Alcohol (A)

The alcohol (A) of the first embodiment has a vapor pressure at 25° C. of 0.05 mmHg or greater and a solubility at 25° C. in 100 g of water of less than 3 g.

Examples of the low-water-solubility alcohol (A) include alcohols that are used as common alcoholic flavors. More specifically, examples include alcohols having 7 or more carbon atoms and listed as aliphatic higher alcohols in Standards and Criteria for Food and Food Additives, etc. based on the Food Sanitation Act (extract), 2010 edition (issued in April, 2011 by Japan External Trade Organization (JETRO)). Specifically, the aliphatic higher alcohols include acetone glyceryl acetal, ambrinol, α-bisabolol, borneol, α-campholenol, 1-carveol, carveol, β-caryophyllene alcohol, cedrenol, cedrol, 1-citronellol, cyclohexanol, 2-cyclohexylethanol, 2,4-decadienol, 3-decanol, 2-decenol, 9-decenol, 4-decenol, dihydrocarveol, 7,8-dihydro-β-ionol, 3,7-dimethyl-6-octen-3-ol, dihydromyrcenol, dihydroperillyl alcohol, 2,5-dihydroxy-2,5-dimethyl-1,4-dithiane, 2,6-dimethyl-4-heptanol, 3,7-dimethyl-1,5,7-octatrien-3-ol, 2,6-dimethyl-2-heptanol, 3,6-dimethyl-3-octanol, 2,4-dimethyl-3-pentanol, 2,4-dimethyl-4-nonanol, 2-dodecanol, dodecanol, 2-dodecenol, elemol, 2-ethylbutanol, 2-ethylfenchol, 2-ethylhexanol, farnesol, fenchyl alcohol, geranyllinalool, heptadecanol, heptanal glyceryl acetal, 2-heptanol, 3-heptanol, 4-heptanol, heptanol, 1-hepten-3-ol, 2-heptenol, 3-heptenol, cis-4-heptenol, hexadecanol, 2,4-hexadienol, hexanal glyceryl acetal, 2-hexanol, 3-hexanol, hexanol, 4-hexenol, 1-hexen-3-ol, trans-2-hexenal glyceryl acetal, 2-hexenol, 3-hexenol, cis-2-hexenol, cis-3-hexenol, cis-4-hexenol, trans-2-hexenol, trans-3-hexenol, trans-4-hexenol, hydroxycitronellal diethyl acetal, hydroxycitronellol, α-ionol, β-ionol, isoborneol, isodihydrocarveol, isogeraniol, isophytol, isopulegol, isovaleraldehyde glyceryl acetal, lavandulol, 8-p-menthene-1,2-diol, linalool oxide, 2-p-menthen-1-ol, 2,8-p-menthadien-1-ol, 1,8-p-menthadien-4-ol, menthadienol, p-menthan-2-ol, p-menthan-7-ol, p-menthen-8-ol, 8-p-menthen-7-ol, 3-(menthoxy)-1,2-propanediol, 3-methyl-2-pentanol, 4-methyl-2-pentanol, 6-methyl-3-heptanol, 5-methyl-3-heptanol, 2-methyl-3-pentanol, 6-methyl-5-hepten-2-ol, 2-methyl-5-hepten-2-ol, 5-methylhexanol, 2-methylpentanol, 3-methylpentanol, 4-methylpentanol, 3-(methylthio)hexanol, myrcenol, myrtenol, neodihydrocarveol, d-neomenthol, neomenthol, nerol, cis-nerolidol, trans-nerolidol, nerolidol, 2,4-nonadienol, 3,6-nonadienol, trans, cis-2,6-nonadienol, nonadienol, nonanol, 2-nonanol, 3-nonanol, 1-nonen-3-ol, 3-nonenol, 6-nonenol, cis-2-nonenol, trans-2-nonenol, 2,6-dimethyl-5,7-octadien-2-ol, 1,5-octadien-3-ol, octadecanol, 3,5-octadienol, 1,3-octanediol, 2-octanol, 3-octanol, octanol, 1-octen-3-ol, 2-octen-4-ol, 2-octenol, 3-octenol, cis-5-octenol, cis-9-octadecenol, pentadecanol, perilla alcohol, phytol, pinocarveol, piperitol, rhodinol, α-santalol, sclareol, 1-terpineol, 4-terpineol, α-terpineol, β-terpineol, 4-tert-butylcyclohexanol, tetradecanol, tetrahydrocuminol, 3,7-dimethyloctanol, 3,7-dimethyl-3-octanol, 2,6-dimethyl-2-octanol, 3-thujanol, sabinene hydrate, tridecanol, 2-tridecenol, 3,3,5-trimethylcyclohexanol, 3,5,5-trimethylhexanol, 2,4-undecadienol, 2-undecanol, undecanol, cis,cis-1,5,8-undecatrien-3-ol, 10-undecenol, 2-undecenol, verbenol, vetiverol, viridiflorol, 3-(1-menthoxy)-2-methylpropane-1,2-diol, citral glyceryl acetal, 1-p-menthen-9-ol, 1,2-dihydrolimonen-10-ol, 2,3,4-trimethyl-3-pentanol, 2,4-dimethylcyclohexylmethanol, 2-methyl-1-hepten-3-ol, 2-tert-butylcyclohexanol, 3-ethyl-3-octanol, 4-isopropylcyclohexanol, 5-hexenol, 5-octene-1,3-diol, 6-hydroxydihydrotheaspirane, 8-ethyl-1,5-dimethylbicyclo[3.2.1]octan-8-ol, cis-3-heptenol, cis-4-octenol, cyclododecanol, d-limonen-10-ol, d-trans,cis-1(7), 8-p-menthadien-2-ol, 3,7-dimethyl-1,6-nonadien-3-ol, linalool oxide (pyranoid), 1-trans-2-p-menthenol, nerolidol oxide, nootkatol, p-menthane-3,8-diol, santalol, and tetrahydronootkatol. These low-water-solubility alcohols (A) may be used alone or in a combination of two or more.

Among defoaming agents or bubble breaking agents often used is texanol, other than high-molecular-weight surfactants described above. However, texanol presents a safety problem. On the other hand, aliphatic higher alcohols are oily food flavors with a relatively high octanol/water partition coefficient (Log Pow) (e.g., 2 or greater). Accordingly, when an aliphatic higher alcohol is included as the alcohol (A), excellent low-foaming characteristics and defoaming characteristics are achieved without the inclusion of texanol, and excellent safety is achieved.

The aliphatic higher alcohol may be a cycloaliphatic higher alcohol or an acyclic aliphatic higher alcohol; however, an acyclic aliphatic higher alcohol is preferable because volatility is enhanced, and emulsifiability due to the surface activity effect of the water-soluble solvent (B) (hereinafter also simply referred to as "emulsifiability") is enhanced.

The acyclic aliphatic higher alcohol may be a linear aliphatic higher alcohol or a branched aliphatic higher alcohol; however, a branched aliphatic higher alcohol is preferable because volatility and emulsifiability are enhanced.

It is preferable that the alcohol (A) include a symmetrical alkane skeleton having 7 or more carbon atoms (e.g., 7 to 10). When such an alkane skeleton is included, there is a tendency for low-foaming characteristics and defoaming characteristics to be further improved in a balanced manner. From a similar standpoint, it is preferable that the alkane skeleton have 8 or more carbon atoms; more preferably, the alkane skeleton has 9 or more carbon atoms. In this specification, the term "symmetrical" is used to describe an alkane skeleton in which the carbon atom at a position equidistant from the carbon atoms at both ends of the straight chain of the alkane skeleton is the axis of symmetry. An alcohol (A) having such an alkane skeleton may be at least one selected from the group consisting of 2,6-dimethyl-4-heptanol, 2,6-dimethyl-2-heptanol, 2,4-dimethyl-3-pentanol, and 2,3,4-trimethyl-3-pentanol. Of these, 2,4-dimethyl-3-pentanol and/or 2,6-dimethyl-4-heptanol are preferable from the standpoint of further improving low-foaming characteristics and defoaming characteristics in a balanced manner.

It is preferable that a content of the alcohol (A) in the ink composition of the first embodiment (100 mass %) be greater than 0 mass % and 1.0 mass % or less, from the standpoint of further improving low-foaming characteristics and defoaming characteristics in a balanced manner. The content is more preferably 0.05 mass % or greater and 0.5 mass % or less and even more preferably 0.1 mass % or greater and 0.3 mass % or less.

Solvent (B)

The solvent (B) includes at least one selected from the group consisting of glycol ethers having a vapor pressure at 25° C. of less than 0.050 mmHg and a solubility at 25° C. in 100 g of water of 3 g or greater and alkanediols having a vapor pressure at 25° C. of less than 0.050 mmHg and a solubility at 25° C. in 100 g of water of 3 g or greater.

The glycol ether is not particularly limited provided that the glycol ether has a vapor pressure at 25° C. of less than 0.050 mmHg and a solubility at 25° C. in 100 g of water of 3 g or greater. However, from the standpoint of further improving the reduction in surface tension and low-foaming characteristics and defoaming characteristics in a balanced manner, it is preferable that at least one selected from the group consisting of diethylene glycol mono-n-butyl ether, triethylene glycol monoethyl ether, triethylene glycol mono-n-butyl ether, and tripropylene glycol monomethyl ether be included.

It is preferable that the alkanediol be a linear or branched alkanediol, from the standpoint of further improving the reduction in surface tension and low-foaming characteristics and defoaming characteristics in a balanced manner. Furthermore, from a similar standpoint, it is preferable that the alkanediol have 3 to 6 carbon atoms; more preferably, the alkanediol has 4 to 6 carbon atoms. From a similar standpoint, it is preferable that the alkanediol be a linear or branched alkanediol having 3 to 6 carbon atoms; it is more preferable that the alkanediol include at least one selected from the group consisting of 3-methyl-1,5-pentanediol, 1,2-hexanediol, 1,2-pentanediol, 4-methyl-1,2-pentanediol, and 3,3-dimethyl-1,2-butanediol.

It is preferable that a content of the specific solvent (B) in the ink composition of the first embodiment (100 mass %) be 1.0 mass % or greater and 20.0 mass % or less, from the standpoint of further improving the reduction in surface tension and low-foaming characteristics and defoaming characteristics in a balanced manner. The content is more preferably 2.0 mass % or greater and 15.0 mass % or less and even more preferably 3.0 mass % or greater and 10.0 mass % or less.

It is preferable that a ratio (mass ratio) of the content of the solvent (B) to the content of the alcohol (A) in the ink composition of the first embodiment be 1 to 60, from the standpoint of further improving the reduction in surface tension and low-foaming characteristics and defoaming characteristics in a balanced manner. The ratio is more preferably 10 to 50 and even more preferably 20 to 40.

Specific Surfactant

It is preferable that the ink composition of the first embodiment include a polysiloxane-based surfactant, from the standpoint of further improving wetting characteristics with respect to the surface of a recording medium and further improving the penetration characteristics of the ink, for the recording of a recording product. It is more preferable that the ink composition include a polysiloxane-based surfactant represented by formula (1) below (also referred to as a "specific surfactant"). When the ink composition of the first embodiment includes the specific surfactant, there is a tendency for the alcohol (A) to be dispersed or emulsified in the ink composition more stably.

Chem. 3

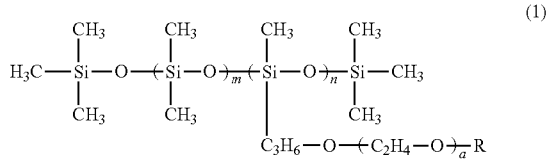

(1)

In formula (1), R represents a hydrogen atom or a methyl group, a represents an integer of 2 to 18, m represents 0 to 70, and n represents 1 to 8.

Examples of the specific surfactant include the surfactants described in Japanese Patent No. 5359018. More specifically, it is preferable that a specific surfactant include at least one selected from the group consisting of a surfactant (a) and a surfactant (b), which are surfactants represented by formula (1), the surfactant (a) satisfying condition (a) described below, the surfactant (b) satisfying condition (b) described below. With such a surfactant, there is a tendency for ink beading-caused non-uniformity to be further suppressed even in a case in which printing is performed on an actual printing stock that is a recording medium.

Condition (a): in formula (1), a is an integer of 2 to 13, m is an integer of 2 to 50, and n is an integer of 1 to (preferably 1 to 5)

Condition (b): in formula (1), R is a methyl group, a is an integer of 6 to 18, m is 0, and n is 1

It is preferable that a specific surfactant include at least one selected from the group consisting of a surfactant (c), a surfactant (d), and a surfactant (e), which are surfactants represented by formula (1), the surfactant (c) satisfying condition (c) described below, the surfactant (d) satisfying condition (d) described below, the surfactant (e) satisfying condition (e) described below. With such a surfactant, there is a tendency for ink beading-caused non-uniformity to be further suppressed.

Condition (c): in formula (1), a is an integer of 2 to 5, m is an integer of 20 to 40, and n is an integer of 2 to Condition (d): in formula (1), a is an integer of 9 to 13, m is an integer of 2 to 4, and n is an integer of 1 to 2

Condition (e): in formula (1), a is an integer of 6 to 10, m is an integer of 10 to 20, and n is an integer of 4 to It is preferable that a specific surfactant include at least one selected from the group consisting of a surfactant (f) and a surfactant (g), which are surfactants represented by formula (1), the surfactant (f) satisfying condition (f) described below, the surfactant (g) satisfying condition (g) described below. With such a surfactant, there is a tendency for ink beading-caused non-uniformity and bleeding to be further suppressed.

Condition (f): in formula (1), a is an integer of 2 to 5, m is an integer of 20 to 40, and n is an integer of 2 to Condition (g): in formula (1), a is an integer of 7 to 11, m is an integer of 30 to 50, and n is an integer of 3 to It is preferable that a specific surfactant include at least one selected from the group consisting of a surfactant (h) and a surfactant (i), which are surfactants represented by formula (1), the surfactant (h) satisfying condition (h) described below, the surfactant (i) satisfying condition (i) described below. With such a surfactant, there is a tendency for ink beading-caused non-uniformity and bleeding to be further suppressed.

Condition (h): in formula (1), R is a methyl group, a is an integer of 9 to 13, m is an integer of 2 to 4, and n is an integer of 1 to 2

Condition (i): in formula (1), a is an integer of 6 to 10, m is an integer of 10 to 20, and n is an integer of 4 to It is preferable that a specific surfactant include a surfactant (j), which is a surfactant represented by formula (1), the surfactant (j) satisfying condition (j) described below. With such a surfactant, there is a tendency for ink beading-caused non-uniformity and bleeding to be further suppressed.

Condition (j): in formula (1), R is a methyl group, a is an integer of 6 to 12, m is 0, and n is 1

It is preferable that a specific surfactant include at least one selected from the group consisting of a surfactant (k), a surfactant (l), and a surfactant (m), which are surfactants represented by formula (1), the surfactant (k) satisfying condition (k) described below, the surfactant (l) satisfying condition (l) described below, the surfactant (m) satisfying condition (m) described below. With such a surfactant, there is a tendency for ink beading-caused non-uniformity and bleeding to be further suppressed.

Condition (k): in formula (1), R is a hydrogen atom, a is an integer of 7 to 11, m is an integer of 30 to 50, and n is an integer of 3 to 5

Condition (l): in formula (1), R is a methyl group, a is an integer of 9 to 13, m is an integer of 2 to 4, and n is an integer of 1 to 2

Condition (m): in formula (1), R is a methyl group, a is an integer of 6 to 10, m is an integer of 10 to 20, and n is an integer of 4 to 8

It is preferable that a specific surfactant include at least one selected from the group consisting of a surfactant (n), a surfactant (o), and a surfactant (p), which are surfactants represented by formula (1), the surfactant (n) satisfying condition (n) described below, the surfactant (o) satisfying condition (o) described below, the surfactant (p) satisfying condition (p) described below. With such a surfactant, there is a tendency for ink beading-caused non-uniformity and bleeding to be further suppressed.

Condition (n): in formula (1), R is a hydrogen atom, a is an integer of 7 to 11, m is an integer of 30 to 50, and n is an integer of 3 to 5

Condition (o): in formula (1), R is a methyl group, a is an integer of 9 to 13, m is an integer of 2 to 4, and n is an integer of 1 to 2

Condition (p): in formula (1), R is a methyl group, a is an integer of 6 to 10, m is an integer of 10 to 20, and n is an integer of 4 to 8

The specific surfactant may be prepared by using a method known in the art or may be a commercially available product. Examples of the commercially available product include, but are not limited to, BYK-306, BYK-307, BYK-333, BYK-341, BYK-345, BYK-346, BYK-347, BYK-348, and BYK-349 (products of BYK Japan KK); KF-351A, KF-352A, KF-353, KF-354L, KF-355A, KF-615A, KF-945, KF-640, KF-642, KF-643, KF-6020, X-22-4515, KF-6011, and KF-6012 (products of Shin-Etsu Chemical Co., Ltd.); and Silface SAG002, 005, 503A, and 008 (products of Nisshin Chemical Industry Co., Ltd.).

It is preferable that a content of the specific surfactant in the ink composition of the first embodiment (100 mass %) be greater than 0 mass % and 1.0 mass % or less, from the standpoint of further improving the penetration characteristics and defoaming characteristics of the ink in a balanced manner. The content is more preferably 0.05 to 0.80 mass % and even more preferably 0.10 to 0.50 mass %.

The ink composition of the first embodiment may include another surfactant (examples include acetylene glycol-based surfactants, fluorosurfactants, Gemini surfactants, anionic surfactants, nonionic surfactants, and amphoteric surfactants) within a scope that does not hinder the advantageous effects of the present invention, or the ink composition may not include any other surfactant.

Coloring Material

The ink composition of the first embodiment includes a coloring material. The coloring material may be selected from dyes and pigments. From the standpoint of color stability in the drying process, light resistance, and water resistance, a pigment is preferable. It is preferable that the pigment be included in a dispersant that can be dispersed in the ink composition.

The pigment may be selected from inorganic pigments and organic pigments. Such pigments may be used alone or in a combination of two or more. Examples of the inorganic pigments include titanium oxide, iron oxide, and carbon black. The carbon black may be carbon black produced by using a known method, such as a contact method, a furnace method, or a thermal method. The organic pigments include azo pigments (e.g., azo lakes, insoluble azo pigments, condensed azo pigments, and chelate azo pigments), polycyclic pigments (e.g., phthalocyanine pigments, perylene pigments, perinone pigments, anthraquinone pigments, quinacridone pigments, dioxane pigments, thioindigo pigments, isoindolinone pigments, and quinophthalone pigments), dye chelates (e.g., basic dye type chelates and acidic dye type chelates), nitro pigments, nitroso pigments, and aniline black.

Specific examples of the pigments may be appropriately mentioned in accordance with the type (color) of the ink composition. When the ink composition is a yellow ink composition, examples of the pigment to be used include C.I. Pigment Yellows 1, 2, 3, 12, 14, 16, 17, 73, 74, 75, 83, 93, 95, 97, 98, 109, 110, 114, 128, 129, 138, 139, 147, 150, 151, 154, 155, 180, and 185. When the ink composition is a magenta ink composition, examples of the pigment to be used include C.I. Pigment Reds 5, 7, 12, 48 (Ca), 48 (Mn), 57 (Ca), 57:1, 112, 122, 123, 168, 184, 202, and 209; and C.I. Pigment Violet 19. When the ink composition is a cyan ink composition, examples of the pigment to be used include C.I. Pigment Blues 1, 2, 3, 15:2, 15:3, 15:4, 15:34, 16, 22, and 60; and C.I. Vat Blues 4 and 60. When the ink composition is a black ink composition, examples of the pigment to be used include inorganic pigments and organic pigments.

Examples of the inorganic pigments include carbons, such as lamp black (C.I. Pigment Black 6), acetylene black, furnace black (C.I. Pigment Black 7), channel black (C.I. Pigment Black 7), and carbon black (C.I. Pigment Black 7), and iron oxide pigments. Examples of the organic pigments include aniline black (C.I. Pigment Black 1).

Although not particularly limited, a content of the coloring material in the ink composition of the first embodiment (100 mass %) is, for example, 1.0 to 10.0 mass %. From the standpoint of producing the advantageous effects of the present invention more effectively and reliably, it is preferable that the content be 2.0 to 8.0 mass %, and it is more preferable that the content be 3.0 to 7.0 mass %.

Resin

From the standpoint of favorably dispersing the coloring material, it is preferable that the ink composition of the first embodiment include a resin. It is preferable that the resin be included in a dispersant. From the standpoint of the dispersibility of the coloring material, it is preferable that the resin be at least one selected from the group consisting of resins containing an oxyethyl skeleton (also referred to as "oxyethyl-skeleton-containing resins"), resins containing a fluorene skeleton (also referred to as "fluorene-skeleton-containing resins"), styrene-acrylic acid-based copolymer resins, and urethane-based resins. More preferably, the resin is at least one selected from the group consisting of oxyethyl-skeleton-containing resins and fluorene-skeleton-containing resins, and, even more preferably, the resin includes an oxyethyl-skeleton-containing resin and a fluorene-skeleton-containing resin. These resins improve dispersibility by adsorbing to the coloring material (pigment, in particular). It is preferable that the resin, together with the pigment, be included in a dispersant.

Oxyethyl-Skeleton-Containing Resin

The oxyethyl-skeleton-containing resin may be, for example, a resin containing an oxyethyl acrylate skeleton and is preferably a compound represented by formula (I) below. The oxyethyl-skeleton-containing resin is one resin used alone or two or more resins used in combination.

Chem. 4

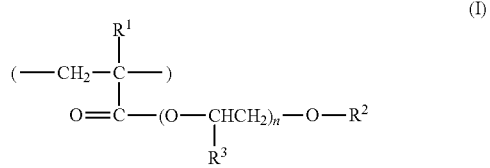

(I)

In formula (I), $R^1$ and $R^3$ are each independently a hydrogen atom or a methyl group, and $R^2$ is an alkyl group or an aryl group, and n is an integer greater than or equal to 1.

An example of the compound represented by formula (I) may be a resin in which 45 to 55 mol % of ortho-hydroxyethylated phenylphenol acrylate, which has CAS No. 72009-86-0, 20 to 30 mol % of acrylic acid, which has CAS No. 79-10-7, and 20 to 30 mol % of methacrylic acid, which has CAS No. 79-41-4, are included as monomers in a manner such that the total amount of the ortho-hydroxyethylated phenylphenol acrylate, the acrylic acid, and the methacrylic acid is 100 mol %. The compositional ratio between the monomers may be such that 70 to 85 mass % of ortho-hydroxyethylated phenylphenol acrylate, which has CAS No. 72009-86-0, 5 to 15 mass % of acrylic acid, which has CAS No. 79-10-7, and 10 to 20 mass % of methacrylic acid, which has CAS No. 79-41-4, are present in a manner such that the total amount of the ortho-hydroxyethylated phenylphenol acrylate, the acrylic acid, and the methacrylic acid is 100 mass %.

Compounds represented by formula (I) preferably include nonylphenoxypolyethylene glycol acrylate and polypropylene glycol #700 acrylate.

It is preferable that a content of the oxyethyl-skeleton-containing resin in the ink composition of the first embodiment (100 mass %) be 0.1 to 5.0 mass %, from the standpoint of producing the advantageous effects of the present invention more effectively and reliably. The content is more preferably 0.3 to 3.0 mass % and more preferably 0.5 to 1.5 mass %. Furthermore, from a similar standpoint, it is preferable that the content of the oxyethyl-skeleton-containing resin be 5 to 50 parts by mass per 100 parts by mass of the coloring material; more preferably, the content is 10 to 40 parts by mass and even more preferably 15 to 25 parts by mass.

Fluorene-Skeleton-Containing Resin

The fluorene-skeleton-containing resin can be obtained by, for example, copolymerizing the monomer units mentioned below.

5-isocyanato-1-(isocyanatomethyl)-1,3,3-trimethylcyclohexane (CAS No. 4098-71-9) 2,2'-[9H-fluoren-9-ylidenebis(4,1-phenyleneoxy)]bis[ethanol] (CAS No. 117344-32-8) 3-hydroxy-2-(hydroxymethyl)-2-methylpropanoic acid (CAS No. 4767-03-7) N,N'-diethyl-ethylenediamine (CAS No. 111-74-0)

The fluorene-skeleton-containing resin is one resin used alone or two or more resins used in combination.

In the fluorene-skeleton-containing resin, the compositional ratio between the monomers is preferably as follows; 5-isocyanato-1-(isocyanatomethyl)-1,3,3-trimethylcyclohexane (CAS No. 4098-71-9) is in an amount of 35 to 45 mass %, 2,2'-[9H-fluoren-9-ylidenebis(4,1-phenyleneoxy)]bis[ethanol] (CAS No. 117344-32-8) is in an amount of 40 to 60 mass %, 3-hydroxy-2-(hydroxymethyl)-2-methylpropanoic acid (CAS No. 4767-03-7) is in an amount of greater than 0 mass % and 15 mass % or less, and N,N-diethyl-ethanamine (CAS No. 121-44-8) is in an amount of greater than 0 mass % and 15 mass % or less, with the total amount of the 5-isocyanato-1-(isocyanatomethyl)-1,3,3-trimethylcyclohexane, the 2,2'-[9H-fluoren-9-ylidenebis(4,1-phenyleneoxy)]bis[ethanol], the 3-hydroxy-2-(hydroxymethyl)-2-methylpropanoic acid, and the N,N-diethyl-ethanamine being 100 mass %.

It is preferable that the number average molecular weight (Mn) of the fluorene-skeleton-containing resin prior to crosslinking be 2000 to 5000, from the standpoint of further ensuring an initial viscosity of the ink composition together with its storage stability. More preferably, the number average molecular weight is 3000 to 4000. Mn is measured by GPC (gel permeation chromatography), for example.

It is preferable that a content of the fluorene-skeleton-containing resin in the ink composition of the first embodiment (100 mass %) be 0.1 to 5.0 mass %, from the standpoint of producing the advantageous effects of the present invention more effectively and reliably. The content is more preferably 0.3 to 3.0 mass % and more preferably 0.5 to 1.5 mass %. Furthermore, from a similar standpoint, it is preferable that the content of the fluorene-skeleton-containing resin be 5 to 50 parts by mass per 100 parts by mass of the coloring material; more preferably, the content is 10 to 40 parts by mass and even more preferably 15 to 25 parts by mass.

Water

The ink composition of the first embodiment includes water. The water is a solvent. The water may be selected from ion-exchanged water, ultrafiltrated water, reverse osmosis water, distilled water, and ultrapure water.

Different Water-Soluble Solvent

The ink composition of the first embodiment may further include a water-soluble solvent having a vapor pressure at 25° C. of 0.05 mmHg or greater and a solubility at 25° C. in 100 g of water of 3 g or greater (also referred to as a "different water-soluble solvent"). It is preferable that the different water-soluble solvent be included, together with the pigment, in a dispersant.

Examples of the different water-soluble solvent include 3-methyl-1,3-butanediol.

It is preferable that a content of the different water-soluble solvent in the ink composition of the first embodiment (100 mass %) be less than or equal to 10.0 mass %, from the standpoint of producing the advantageous effects of the present invention more effectively and reliably. The content is more preferably less than or equal to 5.0 mass % and even more preferably less than or equal to 1.0 mass %.

Furthermore, the ink composition according to the present invention may include additives, in addition to the components described above. Examples of the additives include penetrating agents, recording medium-solubilizing agents, nozzle-clogging inhibitors, preservatives, antioxidants, electrical conductivity modifiers, pH adjusting agents, viscosity modifiers, surface tension modifiers, and oxygen absorbers. These additives may be used alone or in a combination of two or more.

Method for Producing Ink Composition

The ink composition of the first embodiment can be produced by dispersing and mixing together the components described above in an appropriate manner. A specific example is as follows. First, water, a resin, a coloring material, and, as necessary, a solvent (B) or a different water-soluble solvent are mixed together by using a dispersing device known in the art to prepare a homogeneous dispersion. Next, a solution is prepared by mixing together water, an alcohol (A), a solvent (B), and, as necessary, a specific surfactant to achieve solubilization or emulsification. The solution may be appropriately diluted to prepare a diluted liquid, and the diluted liquid and the dispersion may be mixed together and stirred, thereby producing the ink composition.

Ink Jet Recording Method

An ink jet recording method of the first embodiment is a method for performing ink jet recording on a recording medium. The method includes a deposition step in which the ink composition of the first embodiment is ejected and thereby deposited on a recording medium. This step may be carried out while heating the recording medium and the ink composition. The ink jet recording method of the first embodiment uses the ink composition including the alcohol (A), which is highly volatile and reduces surface tension. Accordingly, the method suppresses beading, intercolor bleeding, and the like and, therefore, improves image characteristics. Furthermore, the method has a reduced probability of formation of beads and, therefore, can also be suitably used in a one-pass recording process, which results in excellent high-speed recording characteristics.

Examples of the recording medium include, but are not limited to, ink jet specific paper, PPC paper, fabrics, sublimation transfer sheets, surface-treated sheets (e.g., aluminum-deposited paper, coated paper, art paper, and cast coated paper), plastic films (e.g., polycarbonate films, PET films, and vinyl chloride sheets), and plastic films in which an ink-receiving layer is formed. The ink jet recording method of the first embodiment can be suitably used in plastic films having no ink-receiving layer.

EXAMPLES

The components listed in Table 1 were added to a vessel in a manner such that the compositions listed in Table 1 (unit: parts by mass) were achieved, and the components were mixed together and stirred at room temperature. Thus, diluted liquids A1 to A5 were prepared. Next, the prepared diluted liquids were added to dispersions, which were prepared in advance with the components and compositions listed in Table 2 (unit: parts by mass). The mixture was filtered through a membrane filter having a pore diameter of 5 μm, and thus ink compositions of Examples A1 to A4 and Comparative Examples A1 to A5 were obtained. Note that although an SAG503A was used as the specific surfactant in the present example, any of the compounds represented by formula (1) can be suitably used as the specific surfactant in the present invention. Furthermore, the 3-methyl-1,3-butanediol does not correspond to the alkanediol of the solvent (B) of the first embodiment.

For the diluted liquids A1 to A5 and the inks of Examples A1 to A4 and Comparative Examples A1 to A5 that were obtained, physical properties were evaluated according to the following measurement method or evaluation method.

Surface Tension

Surface tensions of the diluted liquids A1 to A5 and the inks of Examples A1 to A4 and Comparative Examples A1 to A5 were measured using the Wilhelmy method (vertical platinum plate method), and evaluations of surface tension were made according to the following evaluation criteria. The measurement results are shown in Table 1 and Table 2.

Evaluation Criteria
A: Less than 24.0 mN/m
B: 24.0 mN/m or greater and less than 26.0 mN/m
C: 26.0 mN/m or greater Low-Foaming Characteristics and Defoaming Characteristics 30 g of each of the diluted liquids A1 to A5 and the inks of Examples A1 to A4 and Comparative Examples A1 to A5 was poured into a 110 mL LABORAN screw vial bottle, which is a product of AS ONE CORPORATION, and was left to stand until a state in which no bubble layer existed over the liquid surface of the diluted liquid or the ink was achieved. The vial bottle was shaken 30 times for 10 seconds. Thereafter, the vial bottle was placed on a level surface, and, immediately after the placement, a height of bubbles over the liquid surface was measured to evaluate low-forming characteristics. Furthermore, when 1 minute passed after the placement, a height of bubbles over the liquid surface was measured to evaluate defoaming characteristics. The evaluations of low-foaming characteristics and defoaming characteristics were based on the obtained measured values and the following evaluation criteria. The evaluation results are shown in Table 1 and Table 2.

Evaluation Criteria for Low-Foaming Characteristics
A: 0 mm or greater and less than 10 mm
B: 10 mm or greater and less than 20 mm
C: 20 mm or greater and less than 30 mm
D: 30 mm or greater Evaluation Criteria for Defoaming Characteristics
A: 0 mm or greater and less than 3 mm
B: 3 mm or greater and less than 6 mm
C: 6 mm or greater Ink Injection Characteristics For an ink tank fixed to the body of an SC-B7000, which is a product of Seiko Epson Corporation, each of the inks of Examples A1 to A4 and Comparative Examples A1 to A5 was prepared so that printing could be performed. Subsequently, the amount of the ink was adjusted by, for example, collecting bubbles with a syringe in a manner such that the liquid surface of the ink was located at a height of 9 cm from the bottom of the tank. With this adjustment, the volume of the space above the ink in the tank was made to be 1100 mL in a state in which no bubble layer existed over the ink interface. Next, each of the inks of Examples A1 to A4 and Comparative Examples A1 to A5 was loaded into an ink pouch reservoir for SC-B7000s and was left to stand until a state in which no bubble layer existed over the ink interface was achieved. All of the ink in the ink pouch was completely injected into the ink tank in 20 seconds. In the process, in cases in which injection was accomplished without causing spilling of ink from the tank, a rating of "A" was given, and in cases in which ink spilled from the tank, a rating of "B" was given. Thus, ink injection characteristics were evaluated.

Stability Over Time

Each of the inks of Examples A1 and A2 and Comparative Examples A1 to A3 was left to stand in an environment at 60° C. for 5 days. A rate of change in viscosity (%), that is, a viscosity after the ink was left to stand with respect to a viscosity immediately after preparation, was measured. The measured value of each of the inks was less than 10%, and it was therefore confirmed that there were no problems for practical use.

Image Quality Performance

By performing an ink jet process with each of the inks of Examples A1 to A4 and Comparative Examples A1 to A5, image data "Bicycle" of Japanese Standards Association (ISO JIS-SCID No. 5) was recorded on a plain paper roll that is a product of Seiko Epson Corporation. A comparison and analysis of the recorded image data revealed that although no significant difference was observed between Examples and Comparative Examples, intercolor bleeding and the like were suppressed, which indicated good results.

TABLE 1

|  | Diluted liquid A1 | Diluted liquid A2 | Diluted liquid A3 | Diluted liquid A4 | Diluted liquid A5 |
|---|---|---|---|---|---|
| 1,2-hexanediol | 12.0 | 12.0 | 12.0 | 12.0 | 0.0 |
| 3-methoxy-1-butanol | 0.0 | 0.0 | 0.0 | 0.0 | 6.0 |
| 3-methyl-1,3-butanediol | 0.0 | 0.0 | 0.0 | 0.0 | 6.0 |
| 2,6-dimethyl-4-heptanol | 0.4 | 0.4 | 0.0 | 0.0 | 0.4 |
| Polysiloxane-based surfactant | 0.0 | 0.4 | 0.0 | 0.4 | 0.4 |
| Ultrapure water | balance | balance | balance | balance | balance |
| Total | 100 | 100 | 100 | 100 | 100 |
| Surface tension (mN/m) | B | B | C | C | A |
| Low-foaming characteristics | A | B | B | D | B |
| Defoaming characteristics | A | A | B | B | B |

Polysiloxane-based surfactant: SAG503A, product of Nisshin Chemical Industry Co., Ltd.

Ink Composition

An ink composition (also referred to as "ink") of the second embodiment includes water, a resin, a coloring material, an alcohol (A), and a solvent (C). The alcohol (A) has a vapor pressure at 25° C. of 0.05 mmHg or greater and a solubility at 25° C. in 100 g of water of less than 3 g. The solvent (C) includes at least one selected from the group consisting of alkoxy alcohols having a vapor pressure at 25° C. of 0.050 mmHg or greater and a solubility at 25° C. in 100 g of water of 3 g or greater and alkanediols having a vapor pressure at 25° C. of 0.050 mmHg or greater and a solubility at 25° C. in 100 g of water of 3 g or greater. Note that in this specification, the alcohol (A) may be referred to as a low-water-solubility alcohol (A), and the solvent (C) may be referred to as a water-soluble solvent (C).

Such an ink composition has excellent high-speed recording characteristics and fast drying characteristics, and a major reason for this is believed to be as follows; however, the present invention is in no way limited by the major reason. Specifically, when the alcohol (A) is combined with the solvent (C), an emulsion solution can be obtained in which the low-water-solubility alcohol (A) is emulsified with the water-soluble solvent (C). It is believed that as a result of a surface activity effect of the water-soluble solvent (C), the low-water-solubility alcohol (A) is emulsified, forming micelles of approximately 1 μm. The emulsion solution has a low surface tension, which is a main reason that the emulsion solution has excellent wetting characteristics with respect to a recording medium. Further, the ink composition that includes such an emulsion solution having excellent wetting characteristics has low susceptibility to beading even when the amount of landing onto a recording medium is increased. Accordingly, the ink composition enables recording of a recording product to be carried out with a small number of passes (number of scans) and, therefore, has excellent high-speed recording characteristics.

TABLE 2

|  |  | Ex. A1 | Ex. A2 | Ex. A3 | Ex. A4 | Comp. Ex. A1 | Comp. Ex. A2 | Comp. Ex. A3 | Comp. Ex. A4 | Comp. Ex. A5 |
|---|---|---|---|---|---|---|---|---|---|---|
| Type of diluted liquid |  | Diluted liquid A1 | Diluted liquid A2 | Diluted liquid A1 | Diluted liquid A2 | Diluted liquid A3 | Diluted liquid A4 | Diluted liquid A3 | Diluted liquid A4 | Diluted liquid A5 |
| Diluted liquid |  | 50.0 | 50.0 | 50.0 | 50.0 | 50.0 | 50.0 | 50.0 | 50.0 | 50.0 |
| Dispersion | Pigment Black 7 | 5.0 | 5.0 | 5.0 | 5.0 | 5.0 | 5.0 | 5.0 | 5.0 | 5.0 |
|  | Oxyethyl-skeleton-containing resin | 1.0 | 1.0 | 1.0 | 1.0 | 1.0 | 1.0 | 1.0 | 1.0 | 1.0 |
|  | Fluorene-skeleton-containing resin | 1.0 | 1.0 | 1.0 | 1.0 | 1.0 | 1.0 | 1.0 | 1.0 | 1.0 |
|  | 1,2-hexanediol | 1.0 | 1.0 | 0.0 | 0.0 | 1.0 | 1.0 | 0.0 | 0.0 | 0.0 |
|  | 3-methyl-1,3-butanediol | 0.0 | 0.0 | 1.0 | 1.0 | 0.0 | 0.0 | 1.0 | 1.0 | 1.0 |
|  | Ultrapure water | 42.0 | 42.0 | 42.0 | 42.0 | 42.0 | 42.0 | 42.0 | 42.0 | 42.0 |
| Total |  | 100.0 | 100.0 | 100.0 | 100.0 | 100.0 | 100.0 | 100.0 | 100.0 | 100.0 |
| Surface tension (mN/m) |  | B | B | B | B | C | C | C | C | A |
| Low-foaming characteristics |  | A | B | A | B | C | D | C | D | B |
| Defoaming characteristics |  | A | A | A | A | C | C | C | C | C |
| Ink injection characteristics |  | A | A | A | A | B | B | B | B | B |

Oxyethyl-skeleton-containing resin:
resin in which monomer having oxyethyl acrylate structure represented by CAS No. 72009-86-0 is present in amount of approximately 75 mass % in terms of monomer compositional ratio and which has number average molecular weight of 6900
Fluorene-skeleton-containing resin:
resin in which monomer having fluorine skeleton represented by CAS No. 117344-32-8 is present in amount of approximately 50 mass % in terms of monomer compositional ratio and which has number average molecular weight of 3300

A second embodiment of the present invention (hereinafter referred to as the "second embodiment") will be described in detail below. However, the present invention is not limited to the embodiment, and various modifications may be made without departing from the gist of the invention.

Furthermore, the low-water-solubility alcohol (A) and the water-soluble solvent (C) each have a vapor pressure of 0.050 mmHg or greater and, therefore, the ink composition has excellent fast drying characteristics mainly because of the high volatility. Thus, the ink composition of the second embodiment enables recording of a recording product with a small number of passes while beading is prevented and therefore has excellent high-speed recording characteristics. In addition, the ink composition has excellent fast drying characteristics. Accordingly, for example, an image can be formed on a recording medium (e.g., a film or cast coated paper) in a space-saving manner.

Alcohol (A)

The alcohol (A) of the second embodiment has a vapor pressure at 25° C. of 0.05 mmHg or greater and a solubility at 25° C. in 100 g of water of less than 3 g.

Examples of the alcohol (A) include alcohols having 7 or more carbon atoms and listed as aliphatic higher alcohols in Standards and Criteria for Food and Food Additives, etc. based on the Food Sanitation Act (extract), 2010 edition (issued in April, 2011 by Japan External Trade Organization (JETRO)). Specifically, the aliphatic higher alcohols include acetone glyceryl acetal, ambrinol, α-bisabolol, borneol, α-campholenol, 1-carveol, carveol, β-caryophyllene alcohol, cedrenol, cedrol, 1-citronellol, cyclohexanol, 2-cyclohexylethanol, 2,4-decadienol, 3-decanol, 2-decenol, 9-decenol, 4-decenol, dihydrocarveol, 7,8-dihydro-β-ionol, 3,7-dimethyl-6-octen-3-ol, dihydromyrcenol, dihydroperillyl alcohol, 2,5-dihydroxy-2,5-dimethyl-1,4-dithiane, 2,6-dimethyl-4-heptanol, 3,7-dimethyl-1,5,7-octatrien-3-ol, 2,6-dimethyl-2-heptanol, 3,6-dimethyl-3-octanol, 2,4-dimethyl-3-pentanol, 2,4-dimethyl-4-nonanol, 2-dodecanol, dodecanol, 2-dodecenol, elemol, 2-ethylbutanol, 2-ethylfenchol, 2-ethylhexanol, farnesol, fenchyl alcohol, geranyllinalool, heptadecanol, heptanal glyceryl acetal, 2-heptanol, 3-heptanol, 4-heptanol, heptanol, 1-hepten-3-ol, 2-heptenol, 3-heptenol, cis-4-heptenol, hexadecanol, 2,4-hexadienol, hexanal glyceryl acetal, 2-hexanol, 3-hexanol, hexanol, 4-hexenol, 1-hexen-3-ol, trans-2-hexenal glyceryl acetal, 2-hexenol, 3-hexenol, cis-2-hexenol, cis-3-hexenol, cis-4-hexenol, trans-2-hexenol, trans-3-hexenol, trans-4-hexenol, hydroxycitronellal diethyl acetal, hydroxycitronellol, α-ionol, β-ionol, isoborneol, isodihydrocarveol, isogeraniol, isophytol, isopulegol, isovaleraldehyde glyceryl acetal, lavandulol, 8-p-menthene-1,2-diol, linalool oxide, 2-p-menthen-1-ol, 2,8-p-menthadien-1-ol, 1,8-p-menthadien-4-ol, menthadienol, p-menthan-2-ol, p-menthan-7-ol, p-menthan-8-ol, 8-p-menthen-7-ol, 3-(menthoxy)-1,2-propanediol, 3-methyl-2-pentanol, 4-methyl-2-pentanol, 6-methyl-3-heptanol, 5-methyl-3-heptanol, 2-methyl-3-pentanol, 6-methyl-5-hepten-2-ol, 2-methyl-5-hepten-2-ol, 5-methylhexanol, 2-methylpentanol, 3-methylpentanol, 4-methylpentanol, 3-(methylthio)hexanol, myrcenol, myrtenol, neodihydrocarveol, d-neomenthol, neomenthol, nerol, cis-nerolidol, trans-nerolidol, nerolidol, 2,4-nonadienol, 3,6-nonadienol, trans,cis-2,6-nonadienol, nonadienol, nonanol, 2-nonanol, 3-nonanol, 1-nonen-3-ol, 3-nonenol, 6-nonenol, cis-2-nonenol, trans-2-nonenol, 2,6-dimethyl-5,7-octadien-2-ol, 1,5-octadien-3-ol, octadecanol, 3,5-octadienol, 1,3-octanediol, 2-octanol, 3-octanol, octanol, 1-octen-3-ol, 2-octen-4-ol, 2-octenol, 3-octenol, cis-5-octenol, cis-9-octadecenol, pentadecanol, *perilla* alcohol, phytol, pinocarveol, piperitol, rhodinol, α-santalol, sclareol, 1-terpineol, 4-terpineol, α-terpineol, β-terpineol, 4-tert-butylcyclohexanol, tetradecanol, tetrahydrocuminol, 3,7-dimethyloctanol, 3,7-dimethyl-3-octanol, 2,6-dimethyl-2-octanol, 3-thujanol, sabinene hydrate, tridecanol, 2-tridecenol, 3,3,5-trimethylcyclohexanol, 3,5,5-trimethylhexanol, 2,4-undecadienol, 2-undecanol, undecanol, cis,cis-1,5,8-undecatrien-3-ol, 10-undecenol, 2-undecenol, verbenol, vetiverol, viridiflorol, 3-(1-menthoxy)-2-methylpropane-1,2-diol, citral glyceryl acetal, 1-p-menthen-9-ol, 1,2-dihydrolimonen-10-ol, 2,3,4-trimethyl-3-pentanol, 2,4-dimethylcyclohexylmethanol, 2-methyl-1-hepten-3-ol, 2-tert-butylcyclohexanol, 3-ethyl-3-octanol, 4-isopropylcyclohexanol, 5-hexenol, 5-octene-1,3-diol, 6-hydroxydihydrotheaspirane, 8-ethyl-1,5-dimethylbicyclo[3.2.1]octan-8-ol, cis-3-heptenol, cis-4-octenol, cyclododecanol, d-limonen-10-ol, d-trans,cis-1(7), 8-p-menthadien-2-ol, 3,7-dimethyl-1,6-nonadien-3-ol, linalool oxide (pyranoid), 1-trans-2-p-menthenol, nerolidol oxide, nootkatol, p-menthane-3,8-diol, santalol, and tetrahydronootkatol. These alcohols (A) may be used alone or in a combination of two or more.

The aliphatic higher alcohol may be a cycloaliphatic higher alcohol or an acyclic aliphatic higher alcohol; however, an acyclic aliphatic higher alcohol is preferable because volatility is enhanced, and emulsifiability due to the surface activity effect of the water-soluble solvent (C) (hereinafter also simply referred to as "emulsifiability") is enhanced. A major reason for the enhanced emulsifiability of an acyclic aliphatic higher alcohol is believed to be that an acyclic aliphatic higher alcohol and water are not susceptible to layered separation. However, the present invention is in no way limited by the major reason. In this regard, from the standpoint of stable emulsification, increasing the content of the water-soluble solvent (C) may be conceived of. However, with an acyclic aliphatic higher alcohol, stable emulsification can be achieved without increasing the content of the water-soluble solvent (C), which has high volatility, and it is, therefore, possible to address the current market, which strictly regulates the amount of emission of volatile organic compounds (VOCs).

The acyclic aliphatic higher alcohol may be a linear aliphatic higher alcohol or a branched aliphatic higher alcohol; however, a branched aliphatic higher alcohol is preferable because volatility and emulsifiability are enhanced.

It is preferable that the alcohol (A) include a symmetrical alkane skeleton having 7 or more carbon atoms (e.g., 7 to 10). When such an alkane skeleton is included, there is a tendency for the occurrence of beading to be further reduced and for high-speed recording characteristics and fast drying characteristics to be further improved. That is, first, with the alcohol (A), the occurrence of beading can be reduced mainly because the carbon number is 7 or more, and as a result, high-speed recording characteristics are further improved. Furthermore, volatility is increased mainly because the alkane skeleton is symmetrical, and thus there is a tendency for fast drying characteristics to be further improved. From a similar standpoint, it is preferable that the alkane skeleton have 8 or more carbon atoms; more preferably, the alkane skeleton has 9 or more carbon atoms. In this specification, the term "symmetrical" is used to describe an alkane skeleton in which the carbon atom at a position equidistant from the carbon atoms at both ends of the straight chain of the alkane skeleton is the axis of symmetry. An alcohol (A) having such an alkane skeleton may be at least one selected from the group consisting of 2,6-dimethyl-4-heptanol, 2,6-dimethyl-2-heptanol, 2,4-dimethyl-3-pentanol, and 2,3,4-trimethyl-3-pentanol. Of these, at least one selected from the group consisting of 2,4-dimethyl-3-pentanol and 2,6-dimethyl-4-heptanol is preferable from the standpoint of further improving high-speed recording characteristics and fast drying characteristics.

It is preferable that a content of the alcohol (A) in the ink composition of the second embodiment (100 mass %) be greater than 0 mass % and 1.0 mass % or less, from the standpoint of further improving high-speed recording characteristics and fast drying characteristics. The content is more preferably 0.1 mass % or greater and 0.8 mass % or less and even more preferably 0.2 mass % or greater and 0.7 mass % or less.

Solvent (C)

The solvent (C) includes at least one selected from the group consisting of alkoxy alcohols having a vapor pressure at 25° C. of 0.050 mmHg or greater and a solubility at 25° C. in 100 g of water of 3 g or greater and alkanediols having a vapor pressure at 25° C. of 0.050 mmHg or greater and a solubility at 25° C. in 100 g of water of 3 g or greater.

It is preferable that the alkoxy alcohol be at least one selected from the group consisting of 3-methoxy-1-butanol and 3-methoxy-3-methyl-1-butanol, from the standpoint of achieving a higher volatility and emulsifiability.

The alkanediol may be a linear alkanediol or a branched alkanediol. From the standpoint of further improving volatility and emulsifiability in a balanced manner, a branched alkanediol is preferable. Furthermore, from a similar standpoint, it is preferable that the alkanediol have 3 to 5 carbon atoms. The alkanediol that is branched and has 3 to 5 carbon atoms may be at least one selected from the group consisting of 2-methyl-1,3-propanediol and 3-methyl-1,3-butanediol. The alkanediol is preferably 3-methyl-1,3-butanediol.

It is preferable that a content of the solvent (C) in the ink composition of the second embodiment (100 mass %) be 1.0 mass % or greater and 20.0 mass % or less, from the standpoint of improving high-speed recording characteristics and fast drying characteristics in a balanced manner. The content is more preferably 2.0 mass % or greater and 15.0 mass % or less and even more preferably 3.0 mass % or greater and 12.0 mass % or less.

It is preferable that a ratio (mass ratio (C)/(A)) of the content of the solvent (C) to the content of the alcohol (A) in the ink composition of the second embodiment be 1 to 50, from the standpoint of improving high-speed recording characteristics and fast drying characteristics in a balanced manner. The ratio is more preferably 5 to 30 and even more preferably 10 to 25.

It is preferable that the ink composition of the second embodiment further include a water-soluble monoalcohol having a symmetrical alkane skeleton and a solubility at 25° C. in 100 g of water of 3 g or greater (also referred to as a "specific monoalcohol"), from the standpoint of producing the advantageous effects of the present invention more effectively and reliably. Examples of the specific monoalcohol include 2,2-dimethyl-1-propanol (tert-butylcarbinol or neopentyl alcohol). The specific monoalcohol is one monoalcohol used alone or two or more monoalcohols used in combination.

From the standpoint of producing the advantageous effects of the present invention more effectively and reliably, it is preferable that the ink composition of the second embodiment include an organic amine compound as a compound other than the alcohol (A), the solvent (C), the specific monoalcohol, and a different water-soluble solvent, which will be described later, the organic amine compound (also referred to as "specific organic amine compound") having a melting point of 80° C. or higher and containing a hydroxyl group. Examples of the specific organic amine compound include amino methyl propanediol and amino hydroxymethyl propanediol. The specific organic amine compound is one compound used alone or two or more compounds used in combination.

It is preferable that the ink composition of the second embodiment further include an alkanediol (D) having a melting point of 80° C. or higher and a solubility at 25° C. in 100 g of water of 3 g or greater, from the standpoint of further improving high-speed recording characteristics and fast drying characteristics in a balanced manner. The alkanediol (D) is solid at room temperature and therefore has a vapor pressure at 25° C. of less than 0.050 mmHg. Thus, the alkanediol (D) is not included in the solvent (C). The alkanediol (D) may be one alkanediol used alone or two or more alkanediols used in combination. In particular, from a similar standpoint, it is preferable that the alkanediol (D) include a symmetrical alkane skeleton; more preferably, the alkanediol (D) is 2,5-dimethyl-2,5-hexanediol.

It is preferable that a content of the alkanediol (D) in the ink composition of the second embodiment (100 mass %) be 3.0 mass % or greater and 18.0 mass % or less. The content is more preferably 3.0 mass % or greater and 9.0 mass % or less and even more preferably 6.0 mass % or greater and 9.0 mass % or less. When the content is greater than or equal to 3.0 mass %, there is a tendency for fast drying characteristics to be further improved. When the content is less than or equal to 18.0 mass %, it is possible to suppress the emulsifiability resulting from the surface activity effect of the water-soluble solvent (C) from being affected by the inclusion of the alkanediol (D). As a result, problems associated with a deterioration of the emulsifiability tend not to arise. Examples of the problems include separation of the alcohol (A) and precipitation of the alkanediol, which is solid at room temperature, in the ink composition.

Specific Surfactant

It is preferable that the ink composition of the second embodiment include a polysiloxane-based surfactant, from the standpoint of further improving wetting characteristics with respect to the surface of a recording medium and further improving the penetration characteristics of the ink, for the forming of a recording product. It is more preferable that the polysiloxane-based surfactant include a polysiloxane-based surfactant represented by formula (1) below (also referred to as a "specific surfactant"). When the ink composition of the second embodiment includes the specific surfactant, there is a tendency for the alcohol (A) to be dispersed or emulsified in the ink composition more stably.

Chem. 5

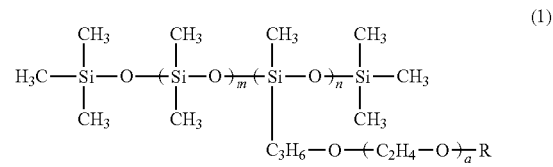

(1)

In formula (1), R represents a hydrogen atom or a methyl group, a represents an integer of 2 to 18, m represents 0 to 70, and n represents 1 to 8.

Examples of the specific surfactant include the surfactants described in Japanese Patent No. 5359018. More specifically, it is preferable that a specific surfactant include a surfactant (a) and/or a surfactant (b), which are surfactants represented by formula (1), the surfactant (a) satisfying condition (a) described below, the surfactant (b) satisfying condition (b) described below. With such a surfactant, there is a tendency for ink beading-caused non-uniformity to be further suppressed even in a case in which the ink composition is printed on an actual printing stock that serves as a recording medium.

Condition (a): in formula (1), a is an integer of 2 to 13, m is an integer of 2 to 50, and n is an integer of 1 to (preferably 1 to 5)

Condition (b): in formula (1), R is a methyl group, a is an integer of 6 to 18, m is 0, and n is 1

It is preferable that a specific surfactant include at least one selected from the group consisting of a surfactant (c), a surfactant (d), and a surfactant (e), which are surfactants represented by formula (1), the surfactant (c) satisfying condition (c) described below, the surfactant (d) satisfying condition (d) described below, the surfactant (e) satisfying condition (e) described below. With such a surfactant, there is a tendency for ink beading-caused non-uniformity that may occur in printing to be further suppressed.

Condition (c): in formula (1), a is an integer of 2 to 5, m is an integer of 20 to 40, and n is an integer of 2 to Condition (d): in formula (1), a is an integer of 9 to 13, m is an integer of 2 to 4, and n is an integer of 1 to 2

Condition (e): in formula (1), a is an integer of 6 to 10, m is an integer of 10 to 20, and n is an integer of 4 to It is preferable that a specific surfactant include at least one selected from the group consisting of a surfactant (f) and a surfactant (g), which are surfactants represented by formula (1), the surfactant (f) satisfying condition (f) described below, the surfactant (g) satisfying condition (g) described below. With such a surfactant, there is a tendency for ink beading-caused non-uniformity and bleeding that may occur in printing to be further suppressed.

Condition (f): in formula (1), a is an integer of 2 to 5, m is an integer of 20 to 40, and n is an integer of 2 to Condition (g): in formula (1), a is an integer of 7 to 11, m is an integer of 30 to 50, and n is an integer of 3 to It is preferable that a specific surfactant include at least one selected from the group consisting of a surfactant (h) and a surfactant (i), which are surfactants represented by formula (1), the surfactant (h) satisfying condition (h) described below, the surfactant (i) satisfying condition (i) described below. With such a surfactant, there is a tendency for ink beading-caused non-uniformity and bleeding that may occur in printing to be further suppressed.

Condition (h): in formula (1), R is a methyl group, a is an integer of 9 to 13, m is an integer of 2 to 4, and n is an integer of 1 to 2

Condition (i): in formula (1), a is an integer of 6 to 10, m is an integer of 10 to 20, and n is an integer of 4 to It is preferable that a specific surfactant include a surfactant (j), which is a surfactant represented by formula (1), the surfactant (j) satisfying condition (j) described below. With such a surfactant, there is a tendency for ink beading-caused non-uniformity and bleeding that may occur in printing to be further suppressed.

Condition (j): in formula (1), R is a methyl group, a is an integer of 6 to 12, m is 0, and n is 1

It is preferable that a specific surfactant include at least one selected from the group consisting of a surfactant (k), a surfactant (l), and a surfactant (m), which are surfactants represented by formula (1), the surfactant (k) satisfying condition (k) described below, the surfactant (l) satisfying condition (l) described below, the surfactant (m) satisfying condition (m) described below. With such a surfactant, there is a tendency for ink beading-caused non-uniformity and bleeding that may occur in printing to be further suppressed.

Condition (k): in formula (1), R is a hydrogen atom, a is an integer of 7 to 11, m is an integer of 30 to 50, and n is an integer of 3 to 5

Condition (l): in formula (1), R is a methyl group, a is an integer of 9 to 13, m is an integer of 2 to 4, and n is an integer of 1 to 2

Condition (m): in formula (1), R is a methyl group, a is an integer of 6 to 10, m is an integer of 10 to 20, and n is an integer of 4 to 8

It is preferable that a specific surfactant include at least one selected from the group consisting of a surfactant (n), a surfactant (o), and a surfactant (p), which are surfactants represented by formula (1), the surfactant (n) satisfying condition (n) described below, the surfactant (o) satisfying condition (o) described below, the surfactant (p) satisfying condition (p) described below. With such a surfactant, there is a tendency for ink beading-caused non-uniformity and bleeding that may occur in printing to be further suppressed.

Condition (n): in formula (1), R is a hydrogen atom, a is an integer of 7 to 11, m is an integer of 30 to 50, and n is an integer of 3 to 5

Condition (o): in formula (1), R is a methyl group, a is an integer of 9 to 13, m is an integer of 2 to 4, and n is an integer of 1 to 2

Condition (p): in formula (1), R is a methyl group, a is an integer of 6 to 10, m is an integer of 10 to 20, and n is an integer of 4 to 8

The specific surfactant may be prepared by using a method known in the art or may be a commercially available product. Examples of the commercially available product include, but are not limited to, BYK-306, BYK-307, BYK-333, BYK-341, BYK-345, BYK-346, BYK-347, BYK-348, and BYK-349 (products of BYK Japan KK); KF-351A, KF-352A, KF-353, KF-354L, KF-355A, KF-615A, KF-945, KF-640, KF-642, KF-643, KF-6020, X-22-4515, KF-6011, and KF-6012 (products of Shin-Etsu Chemical Co., Ltd.); and Silface SAG002, 005, 503A, and 008 (products of Nisshin Chemical Industry Co., Ltd.).

It is preferable that a content of the specific surfactant in the ink composition of the second embodiment (100 mass %) be greater than 0 mass % and 1.0 mass % or less, from the standpoint of further improving the penetration characteristics of the ink. The content is more preferably 0.05 to 0.80 mass % and even more preferably 0.10 to 0.50 mass %.

The ink composition of the second embodiment may include another surfactant (examples include acetylene glycol-based surfactants, fluorosurfactants, Gemini surfactants, anionic surfactants, nonionic surfactants, and amphoteric surfactants) within a scope that does not hinder the advantageous effects of the present invention, or the ink composition may not include any other surfactant.

Coloring Material

The ink composition of the second embodiment includes a coloring material. The coloring material may be selected from dyes and pigments. From the standpoint of color stability in the drying process, light resistance, and water resistance, a pigment is preferable. It is preferable that the pigment be included in a dispersant that can be dispersed in the ink composition.

The pigment may be selected from inorganic pigments and organic pigments. Such pigments may be used alone or in a combination of two or more. Examples of the inorganic pigments include titanium oxide, iron oxide, and carbon black. The carbon black may be carbon black produced by using a known method, such as a contact method, a furnace method, or a thermal method. The organic pigments include azo pigments (e.g., azo lakes, insoluble azo pigments, condensed azo pigments, and chelate azo pigments), polycyclic pigments (e.g., phthalocyanine pigments, perylene pigments, perinone pigments, anthraquinone pigments, quinacridone pigments, dioxane pigments, thioindigo pigments, isoindolinone pigments, and quinophthalone pigments), dye chelates (e.g., basic dye type chelates and acidic dye type chelates), nitro pigments, nitroso pigments, and aniline black.

Specific examples of the pigments may be appropriately mentioned in accordance with the type (color) of the ink composition. When the ink composition is a yellow ink composition, examples of the pigment to be used include C.I. Pigment Yellows 1, 2, 3, 12, 14, 16, 17, 73, 74, 75, 83, 93, 95, 97, 98, 109, 110, 114, 128, 129, 138, 139, 147, 150, 151, 154, 155, 180, and 185. When the ink composition is a magenta ink composition, examples of the pigment to be used include C.I. Pigment Reds 5, 7, 12, 48 (Ca), 48 (Mn), 57 (Ca), 57:1, 112, 122, 123, 168, 184, 202, and 209; and C.I. Pigment Violet 19. When the ink composition is a cyan ink composition, examples of the pigment to be used include C.I. Pigment Blues 1, 2, 3, 15:2, 15:3, 15:4, 15:34, 16, 22, and 60; and C.I. Vat Blues 4 and 60. When the ink composition is a black ink composition, examples of the pigment to be used include inorganic pigments and organic pigments. Examples of the inorganic pigments include carbons, such as lamp black (C.I. Pigment Black 6), acetylene black, furnace black (C.I. Pigment Black 7), channel black (C.I. Pigment Black 7), and carbon black (C.I. Pigment Black 7), and iron oxide pigments. Examples of the organic pigments include aniline black (C.I. Pigment Black 1).

Although not particularly limited, a content of the coloring material in the ink composition of the second embodiment (100 mass %) is, for example, 1.0 to 10.0 mass %. From the standpoint of producing the advantageous effects of the present invention more effectively and reliably, it is preferable that the content be 2.0 to 8.0 mass %, and it is more preferable that the content be 3.0 to 7.0 mass %.

Resin

From the standpoint of favorably dispersing the coloring material, it is preferable that the ink composition of the second embodiment include a resin. It is preferable that the resin be included in a dispersant. From the standpoint of coloring material dispersibility, it is preferable that the resin be at least one selected from the group consisting of resins containing an oxyethyl skeleton (also referred to as "oxyethyl-skeleton-containing resins"), resins containing a fluorene skeleton (also referred to as "fluorene-skeleton-containing resins"), styrene-acrylic acid-based copolymer resins, and urethane-based resins. More preferably, the resin is at least one selected from the group consisting of oxyethyl-skeleton-containing resins and fluorene-skeleton-containing resins, and, even more preferably, the resin includes an oxyethyl-skeleton-containing resin and a fluorene-skeleton-containing resin. These resins improve dispersibility by adsorbing to the coloring material (pigment, in particular). It is preferable that the resin, together with the pigment, be included in a dispersant.

Oxyethyl-Skeleton-Containing Resin

The oxyethyl-skeleton-containing resin may be, for example, a resin containing an oxyethyl acrylate skeleton and is preferably a compound represented by formula (I) below. The oxyethyl-skeleton-containing resin is one resin used alone or two or more resins used in combination.

Chem. 6

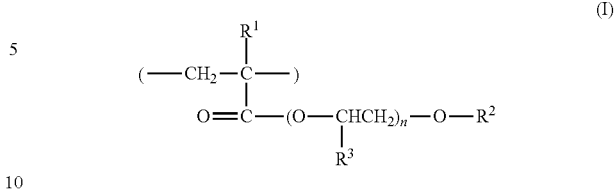

In formula (I), $R^1$ and $R^3$ are each independently a hydrogen atom or a methyl group, and $R^2$ is an alkyl group or an aryl group, and n is an integer greater than or equal to 1.

An example of the compound represented by formula (I) may be a resin in which 45 to 55 mol % of ortho-hydroxyethylated phenylphenol acrylate, which has CAS No. 72009-86-0, 20 to 30 mol % of acrylic acid, which has CAS No. 79-10-7, and 20 to 30 mol % of methacrylic acid, which has CAS No. 79-41-4, are included as monomers in a manner such that the total amount of the ortho-hydroxyethylated phenylphenol acrylate, the acrylic acid, and the methacrylic acid is 100 mol %. The compositional ratio between the monomers may be such that 70 to 85 mass % of ortho-hydroxyethylated phenylphenol acrylate, which has CAS No. 72009-86-0, 5 to 15 mass % of acrylic acid, which has CAS No. 79-10-7, and 10 to 20 mass % of methacrylic acid, which has CAS No. 79-41-4, are present in a manner such that the total amount of the ortho-hydroxyethylated phenylphenol acrylate, the acrylic acid, and the methacrylic acid is 100 mass %.

Compounds represented by formula (I) preferably include nonylphenoxypolyethylene glycol acrylate and polypropylene glycol #700 acrylate.

It is preferable that a content of the oxyethyl-skeleton-containing resin in the ink composition of the second embodiment (100 mass %) be 0.1 to 5.0 mass %, from the standpoint of producing the advantageous effects of the present invention more effectively and reliably. The content is more preferably 0.3 to 3.0 mass % and more preferably 0.5 to 1.5 mass %. Furthermore, from a similar standpoint, it is preferable that the content of the oxyethyl-skeleton-containing resin be 5 to 50 parts by mass per 100 parts by mass of the coloring material; more preferably, the content is 10 to 40 parts by mass and even more preferably 15 to 25 parts by mass.

Fluorene-Skeleton-Containing Resin

The fluorene-skeleton-containing resin can be obtained by, for example, copolymerizing the monomer units mentioned below.

5-isocyanato-1-(isocyanatomethyl)-1,3,3-trimethylcyclohexane (CAS No. 4098-71-9)

2,2'-[9H-fluoren-9-ylidenebis(4,1-phenyleneoxy)]bis[ethanol] (CAS No. 117344-32-8)

3-hydroxy-2-(hydroxymethyl)-2-methylpropanoic acid (CAS No. 4767-03-7)

N,N'-diethyl-ethylenediamine (CAS No. 111-74-0)

The fluorene-skeleton-containing resin is one resin used alone or two or more resins used in combination.

In the fluorene-skeleton-containing resin, the compositional ratio between the monomers is preferably as follows; 5-isocyanato-1-(isocyanatomethyl)-1,3,3-trimethylcyclohexane (CAS No. 4098-71-9) is in an amount of 35 to 45 mass %, 2,2'-[9H-fluoren-9-ylidenebis(4,1-phenyleneoxy)]bis[ethanol] (CAS No. 117344-32-8) is in an amount of 40 to 60 mass %, 3-hydroxy-2-(hydroxymethyl)-2-methylpropanoic acid (CAS No. 4767-03-7) is in an amount of greater than 0 mass % and 15 mass % or less, and N,N-diethylethanamine (CAS No. 121-44-8) is in an amount of greater than 0 mass % and 15 mass % or less, with the total amount of the 5-isocyanato-1-(isocyanatomethyl)-1,3,3-trimethyl-cyclohexane, the 2,2'-[9H-fluoren-9-ylidenebis(4,1-phenyleneoxy)]bis[ethanol], the 3-hydroxy-2-(hydroxymethyl)-2-methylpropanoic acid, and the N,N-diethyl-ethanamine being 100 mass %.

It is preferable that the number average molecular weight (Mn) of the fluorene-skeleton-containing resin prior to crosslinking be 2000 to 5000, from the standpoint of further ensuring an initial viscosity of the ink composition together with its storage stability. More preferably, the number average molecular weight is 3000 to 4000. Mn is measured by GPC (gel permeation chromatography), for example.

It is preferable that a content of the fluorene-skeleton-containing resin in the ink composition of the second embodiment (100 mass %) be 0.1 to 5.0 mass %, from the standpoint of producing the advantageous effects of the present invention more effectively and reliably. The content is more preferably 0.3 to 3.0 mass % and more preferably 0.5 to 1.5 mass %. Furthermore, from a similar standpoint, it is preferable that the content of the fluorene-skeleton-containing resin be 5 to 50 parts by mass per 100 parts by mass of the coloring material; more preferably, the content is 10 to 40 parts by mass and even more preferably 15 to 25 parts by mass.

Different Water-Soluble Solvent

The ink composition of the second embodiment may further include a water-soluble solvent having a vapor pressure at 25° C. of less than 0.050 mmHg or and a solubility at 25° C. in 100 g of water of 3 g or greater (also referred to as a "different water-soluble solvent"), in addition to the alkanediol (D). It is preferable that the different water-soluble solvent be included, together with the pigment, in a dispersant.

The different water-soluble solvent may be, for example, at least one selected from the group consisting of 1,2-hexanediol, 1,6-hexanediol, 1,5-pentanediol, 3-methyl-1,5-pentanediol, 2,5-dimethyl-2,5-hexanediol, and 2,4-diethyl-1,5-pentanediol. These different water-soluble solvents may be used alone or in a combination of two or more.

It is preferable that a content of the different water-soluble solvent in the ink composition of the second embodiment (100 mass %) be less than or equal to 10.0 mass %, from the standpoint of producing the advantageous effects of the present invention more effectively and reliably. The content is more preferably less than or equal to 5.0 mass % and even more preferably less than or equal to 1.0 mass %.

Water

The ink composition of the second embodiment includes water. The water is a solvent. The water may be selected from ion-exchanged water, ultrafiltrated water, reverse osmosis water, distilled water, and ultrapure water.

Furthermore, the ink composition according to the present invention may include additives, in addition to the components described above. Examples of the additives include penetrating agents, recording medium-solubilizing agents, nozzle-clogging inhibitors, preservatives, antioxidants, electrical conductivity modifiers, pH adjusting agents, viscosity modifiers, surface tension modifiers, and oxygen absorbers. These additives may be used alone or in a combination of two or more.

Method for Producing Ink Composition

The ink composition of the second embodiment can be produced by dispersing and mixing together the components described above in an appropriate manner. A specific example is as follows. First, water, a resin, a coloring material, and, as necessary, a different water-soluble solvent are mixed together by using a dispersing device known in the art to prepare a homogeneous dispersion. Next, an emulsion solution is prepared by mixing together water, an alcohol (A), a solvent (C), and, as necessary, a specific surfactant and an alkanediol (D) to achieve emulsification. The emulsion solution may be appropriately diluted to prepare a diluted liquid, and the diluted liquid and the dispersion may be mixed together and stirred, thereby producing the ink composition. Furthermore, such a diluted liquid including three or more components may be in a form in which two or more separate layers are present, provided that, for example, one layer can be formed by mixing and stirring the diluted liquid and a dispersion together or one layer can be formed by using a stirring means included in a recording apparatus.

Ink Jet Recording Method

An ink jet recording method of the second embodiment is a method for performing ink jet recording on a recording medium. The method includes a deposition step in which the ink composition of the second embodiment is ejected and thereby deposited on a recording medium. The deposition step may be carried out while heating the recording medium and the ink composition. In the ink jet recording method of the second embodiment, the ink composition of the second embodiment is ejected and deposited onto a recording medium, which results in suppression of beading and enables recording of a recording product to be carried out with a small number of passes (number of scans), and, consequently, excellent high-speed recording characteristics are achieved, and excellent fast drying characteristics are achieved.

Examples of the recording medium include, but are not limited to, surface-treated sheets (e.g., aluminum-deposited paper, coated paper, art paper, and cast coated paper), plastic films (e.g., polycarbonate films, PET films, and vinyl chloride sheets), and plastic films in which an ink-receiving layer is formed. The ink jet recording method of the second embodiment can be suitably used in plastic films having no ink-receiving layer.

EXAMPLES

The components listed in Table 3 were added to a vessel in a manner such that the compositions listed in Table 3 and Table 4 (unit: parts by mass) were achieved, and the components were mixed together and stirred at room temperature. Thus, diluted liquids B1 to B34 were prepared. Next, as shown in Table 3 and Table 4, the prepared diluted liquids were diluted 1:1 with ultrapure water to obtain aqueous solutions of Reference Examples B1 to B34. Also, the prepared diluted liquids were added to dispersions (diluted 1:1 with dispersions). The dispersions were prepared in advance with the components and compositions listed in Table 5 to Table 10 (unit: parts by mass). The mixture was filtered through a membrane filter having a pore diameter of 5 μm, and thus ink compositions of Examples B1 to B16 Comparative Examples B1 to B18 were obtained. Note that although an SAG503A, which is a product of Nisshin Chemical Industry Co., Ltd., was used as the specific surfactant in the present example, the present invention is not limited to this, and any of the compounds represented by formula (1) can be suitably used as the specific surfactant.

TABLE 3

| | Type of diluted liquid | | | | | | | | |
|---|---|---|---|---|---|---|---|---|---|
| | Diluted liquid B1 | Diluted liquid B2 | Diluted liquid B3 | Diluted liquid B4 | Diluted liquid B5 | Diluted liquid B6 | Diluted liquid B7 | Diluted liquid B8 | Diluted liquid B9 |
| 3-methoxy-1-butanol | 0.0 | 12.0 | 12.0 | 12.0 | 12.0 | 0.0 | 0.0 | 0.0 | 0.0 |
| 3-methoxy-3-methyl-1-butanol | 0.0 | 0.0 | 0.0 | 0.0 | 0.0 | 12.0 | 12.0 | 12.0 | 12.0 |
| 3-methyl-1,3-butanediol | 0.0 | 0.0 | 0.0 | 0.0 | 0.0 | 0.0 | 0.0 | 0.0 | 0.0 |
| 2,6-dimethyl-4-heptanol | 1.0 | 0.0 | 0.0 | 1.0 | 1.0 | 0.0 | 0.0 | 1.0 | 1.0 |
| 1,2-hexanediol | 12.0 | 0.0 | 0.0 | 0.0 | 0.0 | 0.0 | 0.0 | 0.0 | 0.0 |
| 1,2-octanediol | 0.0 | 0.0 | 1.0 | 0.0 | 0.0 | 0.0 | 1.0 | 0.0 | 0.0 |
| Polysiloxane-based surfactant | 0.4 | 0.4 | 0.4 | 0.0 | 0.4 | 0.4 | 0.4 | 0.0 | 0.4 |
| Ultrapure water | balance | balance | balance | balance | balance | balance | balance | balance | balance |
| Total | 50.0 | 50.0 | 50.0 | 50.0 | 50.0 | 50.0 | 50.0 | 50.0 | 50.0 |

| | Type of diluted liquid | | | | | | | |
|---|---|---|---|---|---|---|---|---|
| | Diluted liquid B10 | Diluted liquid B11 | Diluted liquid B12 | Diluted liquid B13 | Diluted liquid B14 | Diluted liquid B15 | Diluted liquid B16 | Diluted liquid B17 |
| 3-methoxy-1-butanol | 3.0 | 3.0 | 3.0 | 3.0 | 6.0 | 6.0 | 6.0 | 6.0 |
| 3-methoxy-3-methyl-1-butanol | 0.0 | 0.0 | 0.0 | 0.0 | 0.0 | 0.0 | 0.0 | 0.0 |
| 3-methyl-1,3-butanediol | 9.0 | 9.0 | 9.0 | 9.0 | 6.0 | 6.0 | 6.0 | 6.0 |
| 2,6-dimethyl-4-heptanol | 0.0 | 0.0 | 0.5 | 0.5 | 0.0 | 0.0 | 0.5 | 0.5 |
| 1,2-hexanediol | 0.0 | 0.0 | 0.0 | 0.0 | 0.0 | 0.0 | 0.0 | 0.0 |
| 1,2-octanediol | 0.0 | 1.0 | 0.0 | 0.0 | 0.0 | 1.0 | 0.0 | 0.0 |
| Polysiloxane-based surfactant | 0.4 | 0.4 | 0.0 | 0.4 | 0.4 | 0.4 | 0.0 | 0.4 |
| Ultrapure water | balance | balance | balance | balance | balance | balance | balance | balance |
| Total | 50.0 | 50.0 | 50.0 | 50.0 | 50.0 | 50.0 | 50.0 | 50.0 |

Polysiloxane-based surfactant: SAG503A, product of Nisshin Chemical Industry Co., Ltd.

TABLE 4

| | Type of diluted liquid | | | | | | | | |
|---|---|---|---|---|---|---|---|---|---|
| | Diluted liquid B18 | Diluted liquid B19 | Diluted liquid B20 | Diluted liquid B21 | Diluted liquid B22 | Diluted liquid B23 | Diluted liquid B24 | Diluted liquid B25 | Diluted liquid B26 |
| 3-methoxy-1-butanol | 0.0 | 12.0 | 12.0 | 12.0 | 12.0 | 0.0 | 0.0 | 0.0 | 0.0 |
| 3-methoxy-3-methyl-1-butanol | 0.0 | 0.0 | 0.0 | 0.0 | 0.0 | 12.0 | 12.0 | 12.0 | 12.0 |
| 3-methyl-1,3-butanediol | 0.0 | 0.0 | 0.0 | 0.0 | 0.0 | 0.0 | 0.0 | 0.0 | 0.0 |
| 2,6-dimethyl-4-heptanol | 1.0 | 0.0 | 0.0 | 1.0 | 1.0 | 0.0 | 0.0 | 1.0 | 1.0 |
| 1,2-hexanediol | 12.0 | 0.0 | 0.0 | 0.0 | 0.0 | 0.0 | 0.0 | 0.0 | 0.0 |
| 1,2-octanediol | 0.0 | 0.0 | 1.0 | 0.0 | 0.0 | 0.0 | 1.0 | 0.0 | 0.0 |
| Polysiloxane-based surfactant | 0.4 | 0.4 | 0.4 | 0.0 | 0.4 | 0.4 | 0.4 | 0.0 | 0.4 |
| 2,5-dimethyl-2,5-hexanediol | 6.0 | 6.0 | 6.0 | 6.0 | 6.0 | 6.0 | 6.0 | 6.0 | 6.0 |
| Ultrapure water | balance | balance | balance | balance | balance | balance | balance | balance | balance |
| Total | 50.0 | 50.0 | 50.0 | 50.0 | 50.0 | 50.0 | 50.0 | 50.0 | 50.0 |

| | Type of diluted liquid | | | | | | | |
|---|---|---|---|---|---|---|---|---|
| | Diluted liquid B27 | Diluted liquid B28 | Diluted liquid B29 | Diluted liquid B30 | Diluted liquid B31 | Diluted liquid B32 | Diluted liquid B33 | Diluted liquid B34 |
| 3-methoxy-1-butanol | 3.0 | 3.0 | 3.0 | 3.0 | 6.0 | 6.0 | 6.0 | 6.0 |
| 3-methoxy-3-methyl-1-butanol | 0.0 | 0.0 | 0.0 | 0.0 | 0.0 | 0.0 | 0.0 | 0.0 |
| 3-methyl-1,3-butanediol | 9.0 | 9.0 | 9.0 | 9.0 | 6.0 | 6.0 | 6.0 | 6.0 |
| 2,6-dimethyl-4-heptanol | 0.0 | 0.0 | 0.5 | 0.5 | 0.0 | 0.0 | 0.5 | 0.5 |
| 1,2-hexanediol | 0.0 | 0.0 | 0.0 | 0.0 | 0.0 | 0.0 | 0.0 | 0.0 |
| 1,2-octanediol | 0.0 | 1.0 | 0.0 | 0.0 | 0.0 | 1.0 | 0.0 | 0.0 |
| Polysiloxane-based surfactant | 0.4 | 0.4 | 0.0 | 0.4 | 0.4 | 0.4 | 0.0 | 0.4 |
| 2,5-dimethyl-2,5-hexanediol | 6.0 | 6.0 | 6.0 | 6.0 | 6.0 | 6.0 | 6.0 | 6.0 |
| Ultrapure water | balance | balance | balance | balance | balance | balance | balance | balance |
| Total | 50.0 | 50.0 | 50.0 | 50.0 | 50.0 | 50.0 | 50.0 | 50.0 |

Polysiloxane-based surfactant: SAG503A, product of Nisshin Chemical Industry Co., Ltd.

TABLE 5

| | Aqueous solution | | | | | | | | |
|---|---|---|---|---|---|---|---|---|---|
| | Ref. Ex. B1 | Ref. Ex. B2 | Ref. Ex. B3 | Ref. Ex. B4 | Ref. Ex. B5 | Ref. Ex. B6 | Ref. Ex. B7 | Ref. Ex. B8 | Ref. Ex. B9 |
| Type of diluted liquid | Diluted liquid B1 | Diluted liquid B2 | Diluted liquid B3 | Diluted liquid B4 | Diluted liquid B5 | Diluted liquid B6 | Diluted liquid B7 | Diluted liquid B8 | Diluted liquid B9 |
| Diluted liquid | 50.0 | 50.0 | 50.0 | 50.0 | 50.0 | 50.0 | 50.0 | 50.0 | 50.0 |
| Ultrapure water | balance | balance | balance | balance | balance | balance | balance | balance | balance |
| Total | 100.0 | 100.0 | 100.0 | 100.0 | 100.0 | 100.0 | 100.0 | 100.0 | 100.0 |
| Surface tension (mN/m) | A | C | A | B | A | C | A | B | A |

| | Aqueous solution | | | | | | | |
|---|---|---|---|---|---|---|---|---|
| | Ref. Ex. B10 | Ref. Ex. B11 | Ref. Ex. B12 | Ref. Ex. B13 | Ref. Ex. B14 | Ref. Ex. B15 | Ref. Ex. B16 | Ref. Ex. B17 |
| Type of diluted liquid | Diluted liquid B10 | Diluted liquid B11 | Diluted liquid B12 | Diluted liquid B13 | Diluted liquid B14 | Diluted liquid B15 | Diluted liquid B16 | Diluted liquid B17 |
| Diluted liquid | 50.0 | 50.0 | 50.0 | 50.0 | 50.0 | 50.0 | 50.0 | 50.0 |
| Ultrapure water | balance | balance | balance | balance | balance | balance | balance | balance |
| Total | 100.0 | 100.0 | 100.0 | 100.0 | 100.0 | 100.0 | 100.0 | 100.0 |
| Surface tension (mN/m) | C | A | A | AA | C | A | A | AA |

TABLE 6

| | Aqueous solution | | | | | | | | |
|---|---|---|---|---|---|---|---|---|---|
| | Ref. Ex. B18 | Ref. Ex. B19 | Ref. Ex. B20 | Ref. Ex. B21 | Ref. Ex. B22 | Ref. Ex. B23 | Ref. Ex. B24 | Ref. Ex. B25 | Ref. Ex. B26 |
| Type of diluted liquid | Diluted liquid B18 | Diluted liquid B19 | Diluted liquid B20 | Diluted liquid B21 | Diluted liquid B22 | Diluted liquid B23 | Diluted liquid B24 | Diluted liquid B25 | Diluted liquid B26 |
| Diluted liquid | 50.0 | 50.0 | 50.0 | 50.0 | 50.0 | 50.0 | 50.0 | 50.0 | 50.0 |
| Ultrapure water | balance | balance | balance | balance | balance | balance | balance | balance | balance |
| Total | 100.0 | 100.0 | 100.0 | 100.0 | 100.0 | 100.0 | 100.0 | 100.0 | 100.0 |
| Surface tension (mN/m) | A | C | A | B | A | C | A | B | A |

| | Aqueous solution | | | | | | | |
|---|---|---|---|---|---|---|---|---|
| | Ref. Ex. B27 | Ref. Ex. B28 | Ref. Ex. B29 | Ref. Ex. B30 | Ref. Ex. B31 | Ref. Ex. B32 | Ref. Ex. B33 | Ref. Ex. B34 |
| Type of diluted liquid | Diluted liquid B27 | Diluted liquid B28 | Diluted liquid B29 | Diluted liquid B30 | Diluted liquid B31 | Diluted liquid B32 | Diluted liquid B33 | Diluted liquid B34 |
| Diluted liquid | 50.0 | 50.0 | 50.0 | 50.0 | 50.0 | 50.0 | 50.0 | 50.0 |
| Ultrapure water | balance | balance | balance | balance | balance | balance | balance | balance |
| Total | 100.0 | 100.0 | 100.0 | 100.0 | 100.0 | 100.0 | 100.0 | 100.0 |
| Surface tension (mN/m) | C | A | A | AA | C | A | A | AA |

TABLE 7

| Ink composition | | Ex. B1 | Ex. B2 | Ex. B3 | Ex. B4 | Ex. B5 | Ex. B6 | Ex. B7 | Ex. B8 |
|---|---|---|---|---|---|---|---|---|---|
| Type of diluted liquid | | Diluted liquid B4 | Diluted liquid B5 | Diluted liquid B8 | Diluted liquid B9 | Diluted liquid B12 | Diluted liquid B13 | Diluted liquid B16 | Diluted liquid B17 |
| Diluted liquid | | 50.0 | 50.0 | 50.0 | 50.0 | 50.0 | 50.0 | 50.0 | 50.0 |
| Dispersion | Coloring material | 5.0 | 5.0 | 5.0 | 5.0 | 5.0 | 5.0 | 5.0 | 5.0 |
| | Oxyethyl-skeleton-containing resin | 1.0 | 1.0 | 1.0 | 1.0 | 1.0 | 1.0 | 1.0 | 1.0 |

TABLE 7-continued

| Ink composition | | Ex. B1 | Ex. B2 | Ex. B3 | Ex. B4 | Ex. B5 | Ex. B6 | Ex. B7 | Ex. B8 |
|---|---|---|---|---|---|---|---|---|---|
| | Fluorene-skeleton-containing resin | 1.0 | 1.0 | 1.0 | 1.0 | 1.0 | 1.0 | 1.0 | 1.0 |
| | 1,2-hexanediol | 1.0 | 1.0 | 1.0 | 1.0 | 1.0 | 1.0 | 1.0 | 1.0 |
| | Ultrapure water | 42.0 | 42.0 | 42.0 | 42.0 | 42.0 | 42.0 | 42.0 | 42.0 |
| Total | | 100.0 | 100.0 | 100.0 | 100.0 | 100.0 | 100.0 | 100.0 | 100.0 |
| Surface tension (mN/m) | | B | A | B | A | A | AA | A | AA |
| High-speed recording characteristics (PET film) | | B | A | B | A | B | A | B | A |
| High-speed recording characteristics (cast coated paper) | | — | B | — | B | — | A | — | A |
| Fast drying characteristics | | A | A | A | A | A | A | A | A |

Oxyethyl-skeleton-containing resin:
resin in which monomer having oxyethyl acrylate structure represented by CAS No. 72009-86-0 is present in amount of approximately 75 mass % in terms of monomer compositional ratio and which has number average molecular weight of 6900
Fluorene-skeleton-containing resin:
resin in which monomer having fluorine skeleton represented by CAS No. 117344-32-8 is present in amount of approximately 50 mass % in terms of monomer compositional ratio and which has number average molecular weight of 3300

TABLE 8

| Ink composition | | Ex. B9 | Ex. B10 | Ex. B11 | Ex. B12 | Ex. B13 | Ex. B14 | Ex. B15 | Ex. B16 |
|---|---|---|---|---|---|---|---|---|---|
| Type of diluted liquid | | Diluted liquid B21 | Diluted liquid B22 | Diluted liquid B25 | Diluted liquid B26 | Diluted liquid B29 | Diluted liquid B30 | Diluted liquid B33 | Diluted liquid B34 |
| Diluted liquid | | 50.0 | 50.0 | 50.0 | 50.0 | 50.0 | 50.0 | 50.0 | 50.0 |
| Dispersion | Coloring material | 5.0 | 5.0 | 5.0 | 5.0 | 5.0 | 5.0 | 5.0 | 5.0 |
| | Oxyethyl-skeleton-containing resin | 1.0 | 1.0 | 1.0 | 1.0 | 1.0 | 1.0 | 1.0 | 1.0 |
| | Fluorene-skeleton-containing resin | 1.0 | 1.0 | 1.0 | 1.0 | 1.0 | 1.0 | 1.0 | 1.0 |
| | 1,2-hexanediol | 1.0 | 1.0 | 1.0 | 1.0 | 1.0 | 1.0 | 1.0 | 1.0 |
| | Ultrapure water | 42.0 | 42.0 | 42.0 | 42.0 | 42.0 | 42.0 | 42.0 | 42.0 |
| Total | | 100.0 | 100.0 | 100.0 | 100.0 | 100.0 | 100.0 | 100.0 | 100.0 |
| Surface tension (mN/m) | | B | A | B | A | A | AA | A | AA |
| High-speed recording characteristics (PET film) | | B | A | B | A | B | A | B | A |
| High-speed recording characteristics (cast coated paper) | | — | A | — | A | — | A | — | A |
| Fast drying characteristics | | AA | AA | AA | AA | A | A | A | A |

Oxyethyl-skeleton-containing resin:
resin in which monomer having oxyethyl acrylate structure represented by CAS No. 72009-86-0 is present in amount of approximately 75 mass % in terms of monomer compositional ratio and which has number average molecular weight of 6900
Fluorene-skeleton-containing resin:
resin in which monomer having fluorine skeleton represented by CAS No. 117344-32-8 is present in amount of approximately 50 mass % in terms of monomer compositional ratio and which has number average molecular weight of 3300

TABLE 9

| | | Ink composition | | | | | | | | |
|---|---|---|---|---|---|---|---|---|---|---|
| | | Comp. Ex. B1 | Comp. Ex. B2 | Comp. Ex. B3 | Comp. Ex. B4 | Comp. Ex. B5 | Comp. Ex. B6 | Comp. Ex. B7 | Comp. Ex. B8 | Comp. Ex. B9 |
| Type of diluted liquid | | Diluted liquid B1 | Diluted liquid B2 | Diluted liquid B3 | Diluted liquid B6 | Diluted liquid B7 | Diluted liquid B10 | Diluted liquid B11 | Diluted liquid B14 | Diluted liquid B15 |
| Diluted liquid | | 50.0 | 50.0 | 50.0 | 50.0 | 50.0 | 50.0 | 50.0 | 50.0 | 50.0 |
| Dispersion | Coloring material | 5.0 | 5.0 | 5.0 | 5.0 | 5.0 | 5.0 | 5.0 | 5.0 | 5.0 |
| | Oxyethyl-skeleton-containing resin | 1.0 | 1.0 | 1.0 | 1.0 | 1.0 | 1.0 | 1.0 | 1.0 | 1.0 |
| | Fluorene-skeleton-containing resin | 1.0 | 1.0 | 1.0 | 1.0 | 1.0 | 1.0 | 1.0 | 1.0 | 1.0 |
| | 1,2-hexanediol | 1.0 | 1.0 | 1.0 | 1.0 | 1.0 | 1.0 | 1.0 | 1.0 | 1.0 |
| | Ultrapure water | 42.0 | 42.0 | 42.0 | 42.0 | 42.0 | 42.0 | 42.0 | 42.0 | 42.0 |
| Total | | 100.0 | 100.0 | 100.0 | 100.0 | 100.0 | 100.0 | 100.0 | 100.0 | 100.0 |
| Surface tension | | A | C | A | C | A | C | A | C | A |
| High-speed recording characteristics (PET film) | | A | C | A | C | A | C | A | C | A |

TABLE 9-continued

|  | Ink composition | | | | | | | | |
| --- | --- | --- | --- | --- | --- | --- | --- | --- | --- |
|  | Comp. Ex. B1 | Comp. Ex. B2 | Comp. Ex. B3 | Comp. Ex. B4 | Comp. Ex. B5 | Comp. Ex. B6 | Comp. Ex. B7 | Comp. Ex. B8 | Comp. Ex. B9 |
| High-speed recording characteristics (cast coated paper) | B | — | B | — | B | — | B | — | B |
| Fast drying characteristics | B | A | C | A | C | A | C | A | C |

Oxyethyl-skeleton-containing resin:
resin in which monomer having oxyethyl acrylate structure represented by CAS No. 72009-86-0 is present in amount of approximately 75 mass % in terms of monomer compositional ratio and which has number average molecular weight of 6900
Fluorene-skeleton-containing resin:
resin in which monomer having fluorine skeleton represented by CAS No. 117344-32-8 is present in amount of approximately 50 mass % in terms of monomer compositional ratio and which has number average molecular weight of 3300

TABLE 10

|  |  | Ink composition | | | | | | | | |
| --- | --- | --- | --- | --- | --- | --- | --- | --- | --- | --- |
|  |  | Comp. Ex. B10 | Comp. Ex. B11 | Comp. Ex. B12 | Comp. Ex. B13 | Comp. Ex. B14 | Comp. Ex. B15 | Comp. Ex. B16 | Comp. Ex. B17 | Comp. Ex. B18 |
| Type of diluted liquid |  | Diluted liquid B18 | Diluted liquid B19 | Diluted liquid B20 | Diluted liquid B23 | Diluted liquid B24 | Diluted liquid B27 | Diluted liquid B28 | Diluted liquid B31 | Diluted liquid B32 |
| Diluted liquid |  | 50.0 | 50.0 | 50.0 | 50.0 | 50.0 | 50.0 | 50.0 | 50.0 | 50.0 |
| Dispersion | Coloring material | 5.0 | 5.0 | 5.0 | 5.0 | 5.0 | 5.0 | 5.0 | 5.0 | 5.0 |
|  | Oxyethyl-skeleton-containing resin | 1.0 | 1.0 | 1.0 | 1.0 | 1.0 | 1.0 | 1.0 | 1.0 | 1.0 |
|  | Fluorene-skeleton-containing resin | 1.0 | 1.0 | 1.0 | 1.0 | 1.0 | 1.0 | 1.0 | 1.0 | 1.0 |
|  | 1,2-hexanediol | 1.0 | 1.0 | 1.0 | 1.0 | 1.0 | 1.0 | 1.0 | 1.0 | 1.0 |
|  | Ultrapure water | 42.0 | 42.0 | 42.0 | 42.0 | 42.0 | 42.0 | 42.0 | 42.0 | 42.0 |
| Total |  | 100.0 | 100.0 | 100.0 | 100.0 | 100.0 | 100.0 | 100.0 | 100.0 | 100.0 |
| Surface tension |  | A | C | A | C | A | C | A | C | A |
| High-speed recording characteristics (PET film) |  | A | C | A | C | A | C | A | C | A |
| High-speed recording characteristics (cast coated paper) |  | B | — | B | — | B | — | B | — | B |
| Fast drying characteristics |  | B | AA | C | AA | C | A | C | A | C |

Oxyethyl-skeleton-containing resin:
resin in which monomer having oxyethyl acrylate structure represented by CAS No. 72009-86-0 is present in amount of approximately 75 mass % in terms of monomer compositional ratio and which has number average molecular weight of 6900
Fluorene-skeleton-containing resin:
resin in which monomer having fluorine skeleton represented by CAS No. 117344-32-8 is present in amount of approximately 50 mass % in terms of monomer compositional ratio and which has number average molecular weight of 3300

For the aqueous solutions of Reference Examples B1 to B34 and the ink compositions of Examples B1 to B16 and Comparative Examples B1 to B18 that were obtained, evaluations of physical properties were made by using the evaluation methods described below.

Surface Tension

Surface tensions of the aqueous solutions of Reference Examples B1 to B34 and inks (hereinafter also referred to as "K") prepared by using, as a coloring material, Pigment Black 7 in the ink compositions of Examples B1 to B16 and Comparative Examples B1 to B18 were measured using the Wilhelmy method (vertical platinum plate method), and evaluations of surface tension were made according to the following evaluation criteria. The evaluation results are shown in Table 5 to Table 10.

Evaluation Criteria

AA: Less than 24.0 mN/m
A: 24.0 mN/m or greater and less than 24.5 mN/m
B: 24.5 mN/m or greater and less than 25.0 mN/m
C: 25.0 mN/m or greater High-Speed Recording Characteristics PET Film For each of the examples and comparative examples of the second embodiment, an ink (hereinafter also referred to as "Y") in which Pigment Yellow 74 was used as a coloring material, an ink (hereinafter also referred to as "M") in which Pigment Red 122 was used, and an ink (hereinafter also referred to as "C") in which Pigment Blue 15:3 was used were obtained. An ink set including the inks (Y, M, C, and K) obtained as described above was loaded to ink cartridges of an ink jet printer (a PX-G930, a Seiko Epson Corporation product PX-G930), and an adjustment was made such that recording could be performed with 720 dpi in a main scanning (head drive) direction and 360 dpi in a sub-scanning (recording medium travel) direction on an approximately 128 g/m$^2$ PET film (a Lumirror S10, which is a product of Toray Industries, Inc., with a thickness of 100 microns).

Next, the voltage to be applied to the piezoelectric element of the printer head was adjusted such that the dot size at the time of landing was approximately 3 ng, and further, an adjustment was made such that 720×360 dpi per color for one drive of the printer head was achieved. Next, evaluation samples were obtained by recording a solid image with an A4 width and a 1 cm margin in 2 passes with 720×720 dpi. The recording was performed by bidirectional printing and by unidirectional printing, separately. In this case, the amount of deposition of ink for a single color 100% duty was approximately 1.6 mg/inch$^2$. The evaluation samples immediately after recording (before heat drying) were examined for beading of the ink.

In a case in which beading was observed even in unidirectional printing, the voltage to be applied to the piezoelectric element of the printer head was adjusted such that the dot size at the time of landing was approximately 1.5 ng, and further, an adjustment was made such that 720×360 dpi per color for one drive of the printer head was achieved. Next, evaluation samples were obtained by recording a solid image with an A4 width and a 1 cm margin in 4 passes with 1440×720 dpi. The recording was performed only by unidirectional printing. In this case, the amount of deposition of ink for a single color 100% duty was approximately 1.6 mg/inch$^2$. The evaluation samples immediately after recording (before heat drying) were examined for beading.

Note that the recording was performed in an environment at room temperature and humidity (25° C., 45% humidity). Based on the examination results, evaluations of high-speed recording characteristics in a case in which a PET film is used as a recording medium were made according to the following evaluation criteria. The evaluation results are shown in Table 3 and Table 4.

Evaluation Criteria

A: No beading was observed in 2-pass bidirectional printing

B: Beading was observed in 2-pass bidirectional printing, but no beading was observed in 2-pass unidirectional printing C: Beading was observed in 2-pass unidirectional printing, but no beading was observed in 4-pass unidirectional printing High-Speed Recording Characteristics Cast Coated Paper Also, for each of Examples B2, B4, B6, B8, B10, B12, B14, and B16 and Comparative Examples B1, B3, B5, B7, B9, B10, B12, B14, B16, and B18, which were given the rating A of [High-Speed Recording Characteristics PET Film], an ink (hereinafter also referred to as "Y") in which Pigment Yellow 74 was used as a coloring material, an ink (hereinafter also referred to as "M") in which Pigment Red 122 was used, and an ink (hereinafter also referred to as "C") in which Pigment Blue 15:3 was used were obtained.

An ink set including the inks (Y, M, C, and K) obtained as described above was loaded to ink cartridges of an ink jet printer (a PX-G930, a Seiko Epson Corporation product PX-G930), and an adjustment was made such that recording could be performed with 720 dpi in a main scanning (head drive) direction and 360 dpi in a sub-scanning (recording medium travel) direction on cast coated paper (Mirror Coat Platinum, which is a product of Oji Paper Co., Ltd.).

Next, the voltage to be applied to the piezoelectric element of the printer head was adjusted such that the dot size at the time of landing was approximately 3 ng, and a solid image with an A4 width and a 1 cm margin was recorded on cast coated paper (Mirror Coat Platinum, which is a product of Oji Co., Ltd.) in 4 passes with 1440×720 dpi, with the dpi for one drive being 720×360 dpi. The recording was performed by bidirectional printing.

In this case, the amount of deposition of ink for a single color 100% duty was approximately 3.1 mg/inch$^2$. In cases in which an ink composition having ratings A for both surface tension and fast drying characteristics, which will be described later, was used, beading spots were observed. In cases in which an ink composition having ratings A or higher for both surface tension and fast drying characteristics and having a rating AA for surface tension or fast drying characteristics, which will be described later, was used, no beading spots were observed. Based on the examination results, evaluations of high-speed recording characteristics in a case in which cast coated paper is used as a recording medium were made according to the following evaluation criteria. The evaluation results are shown in Table 5 and Table 6.

Evaluation Criteria

A: No beading was observed in 4-pass bidirectional printing

B: Beading was observed in 4-pass bidirectional printing

Fast Drying Characteristics

The evaluation samples obtained in [High-Speed Recording Characteristics PET Film], described above, were subjected to heat drying at 80° C. for 3 minutes, and thereafter a portion where the solid image was recorded in the recording sample was rubbed with a finger. Then, whether there was a transfer of the coloring material to the finger was examined. In the case in which there was a transfer, heat drying was performed again at 80° C. for 3 minutes. Subsequently, a portion where the solid image was recorded in the recording sample was rubbed with a finger and was examined.

In the case in which the rating was A, the evaluation sample obtained in High-Speed Recording Characteristics PET Film, described above, was again subjected to heat drying at 80° C. for 1 minute, and thereafter a portion where the solid image was recorded in the recording sample was rubbed with a finger. Then, whether there was a transfer of the coloring material to the finger was examined. Based on the examination results, evaluations of fast drying characteristics were made according to the following evaluation criteria. The evaluation results are shown in Table 5 to Table 8. Note that regarding the evaluations of fast drying characteristics, the rating A can be considered to indicate sufficiently high fast drying characteristics, and the rating AA can be considered to indicate extremely high fast drying characteristics.

Evaluation Criteria

AA: After 1-minute drying, there was no transfer of the coloring material to the finger A: After 1-minute drying, there was a transfer of the coloring material to the finger, but after 3-minute drying, there was no transfer of the coloring material to the finger B: After 3-minute drying, there was a transfer of the coloring material to the finger, but after 6-minute drying, there was no transfer of the coloring material to the finger C: After 6-minute drying, there was a transfer of the coloring material to the finger

The invention claimed is:

1. An ink composition comprising:
water;
a resin;
a coloring material;
an alcohol (A) having a vapor pressure at 25° C. of 0.050 mmHg or greater and a solubility at 25° C. in 100 g of water of less than 3 g; and
a solvent (B) including at least one selected from the group consisting of a glycol ether and an alkanediol,
wherein a content of the alcohol (A) is greater than 0% by mass and less than 1% by mass,
the glycol ether is at least one selected from the group consisting of diethylene glycol mono-n-butyl ether, triethylene glycol monoethyl ether, triethylene glycol mono-n-butyl ether, and tripropylene glycol monomethyl ether, and
the alkanediol is at least one selected from the group consisting of 3-methyl-1,5-pentanediol, 1,2-hexanediol, 1,2-pentanediol, 4-methyl-1,2-pentanediol, and 3,3-dimethyl-1,2-butanediol.

2. The ink composition according to claim 1, wherein the alcohol (A) includes a symmetrical alkane skeleton having 7 or more carbon atoms.

3. The ink composition according to claim 1, wherein the alcohol (A) is at least one selected from the group consisting of 2,4-dimethyl-3-pentanol and 2,6-dimethyl-4-heptanol.

4. The ink composition according to claim 1, further comprising a polysiloxane-based surfactant, the polysiloxane-based surfactant being a compound represented by formula (1) below:

Chem. 1

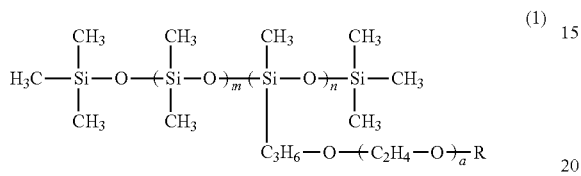
(1)

wherein R represents a hydrogen atom or a methyl group, a represents an integer of 2 to 18, m represents an integer of 0 to 70, and n represents an integer of 1 to 8.

* * * * *